United States Patent
Umesawa et al.

(10) Patent No.: US 8,175,267 B2
(45) Date of Patent: May 8, 2012

(54) COMMUNICATION APPARATUS, COMMUNICATION SYSTEM, TRANSMISSION METHOD, AND COMPUTER PROGRAM PRODUCT

(75) Inventors: Kentaro Umesawa, Kanagawa (JP); Ryuiti Koike, Tokyo (JP); Hideki Matsumoto, Kanagawa (JP); Tatsuyuki Matsushita, Tokyo (JP); Taku Kato, Kanagawa (JP); Haruhiko Toyama, Kanagawa (JP); Hideaki Sato, Kanagawa (JP); Toru Kambayashi, Kanagawa (JP); Satoshi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 721 days.

(21) Appl. No.: 12/333,704

(22) Filed: Dec. 12, 2008

(65) Prior Publication Data

US 2009/0249490 A1 Oct. 1, 2009

(30) Foreign Application Priority Data

Mar. 25, 2008 (JP) ................................. 2008-078239

(51) Int. Cl.
*H04L 9/00* (2006.01)
(52) U.S. Cl. ............... 380/42; 726/26; 380/37; 713/150
(58) Field of Classification Search .......... 380/200–202; 726/26–30; 713/150; 725/28–31
See application file for complete search history.

(56) References Cited

U.S. PATENT DOCUMENTS

| 7,165,050 | B2 | 1/2007 | Marking |
| 7,721,088 | B2 * | 5/2010 | Okamoto et al. ............. 713/157 |
| 2001/0037465 | A1 * | 11/2001 | Hart et al. ..................... 713/201 |
| 2004/0181667 | A1 * | 9/2004 | Venters et al. ................ 713/164 |
| 2005/0190915 | A1 * | 9/2005 | Pare et al. ..................... 380/201 |
| 2006/0262927 | A1 * | 11/2006 | Rutkowski et al. ........... 380/201 |
| 2007/0283167 | A1 * | 12/2007 | Venters et al. ................ 713/189 |

OTHER PUBLICATIONS

U.S. Appl. No. 12/276,835, filed Nov. 24, 2008, Tatsuyuki Matsushita, et al.
Bram Cohen, "The BitTorrent Protocol Specification", http://www.bittorrent.org/beps/bep_0003.html, Jan. 10, 2008, 6 pages.

* cited by examiner

*Primary Examiner* — Nirav B. Patel
(74) *Attorney, Agent, or Firm* — Oblon, Spivak, McClelland, Maier & Neustadt, L.L.P.

(57) ABSTRACT

A communication apparatus stores encrypted pieces having plural pieces as a part of a content encrypted, and number of transmission times. At least one first piece is encrypted by plural different encryption keys. The communication apparatus selects as priority pieces plural encrypted pieces corresponding to at least one first piece among the first pieces, based on number of untransmitted encrypted pieces of which number of transmission times is zero among plural encrypted pieces of which first piece is encrypted, and stores priority piece information specifying the priority piece. When a piece request is received from other communication apparatus, the communication apparatus determines an encrypted piece to be transmitted, based on priority piece information, and transmits the encrypted piece to the other communication apparatus.

25 Claims, 17 Drawing Sheets

FIG.4

| E(K(1, 1))[C1] | E(K(1, 2))[C2] | E(K(1, 3))[C3] | ⋯ | E(K(1, N))[CN] |
|---|---|---|---|---|
| E(K(2, 1))[C1] | | E(K(2, 3))[C3] | | |
| ⋮ | | | | |
| E(K(m, 1))[C1] | | | | |

FIG.5

| E(K(1, 1))[C1] | E(K(1, 2))[C2] | ⋯ | E(K(1, N))[CN] |
|---|---|---|---|
| E(K(2, 1))[C1] | E(K(2, 2))[C2] | | ⋮ |
| ⋮ | ⋮ | | |
| E(K(m, 1))[C1] | E(K(m, 2))[C2] | | E(K(m, N))[CN] |

FIG.6

| E(K(1, 1))[C1] | E(K(1, 2))[C2] | ⋯ | E(K(1, N))[CN] |
|---|---|---|---|
| E(K(2, 1))[C1] | | | |
| ⋮ | | | |
| E(K(m, 1))[C1] | | | |

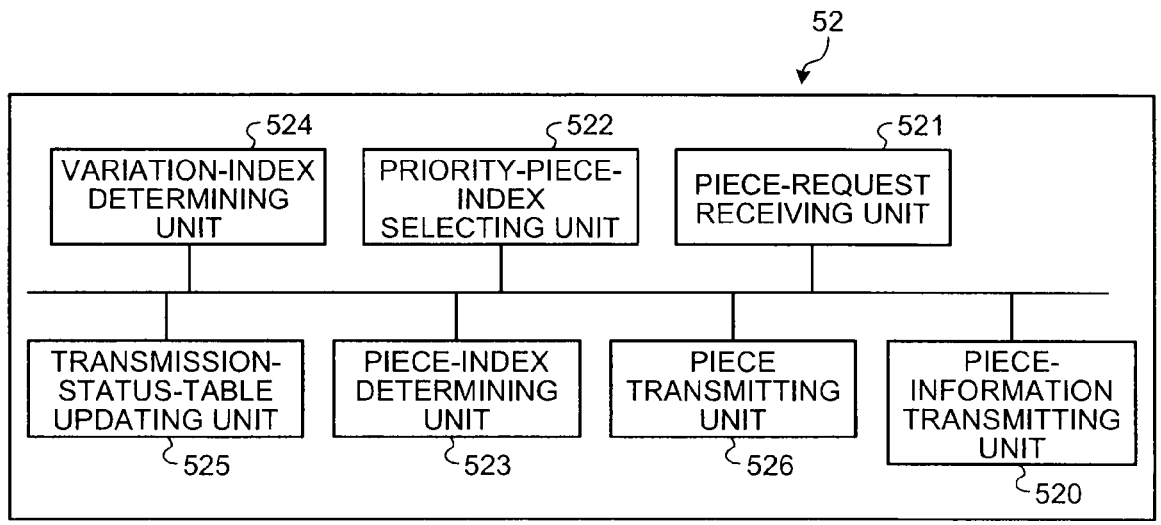

| NODE A | NODE B | ... |
|---|---|---|
| 123.456.789.012:80 | 123.45.67.89:80 | ... |

| (1, 1) | (3, 2) | ... |
|---|---|---|
| hash(E(K(1, 1))[C1]) | hash(E(K(3, 2))[C2]) | ... |

| PART-OBTAINED PIECE INDEX [BYTE RANGE OF UNOBTAINED PART OF ENCRYPTED PIECE] | COMPLETELY UNOBTAINED PIECE INDEX |
|---|---|
| {(1, 19) [100-400], (4,29) [20-300]} | {11,13,15,35,208, ...} |

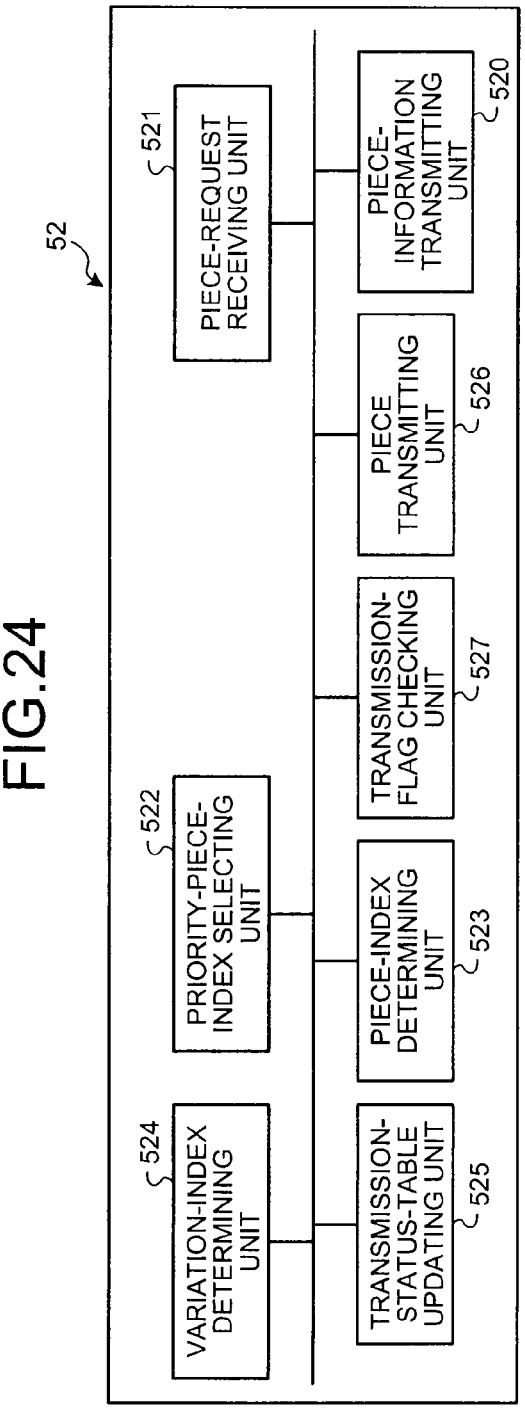

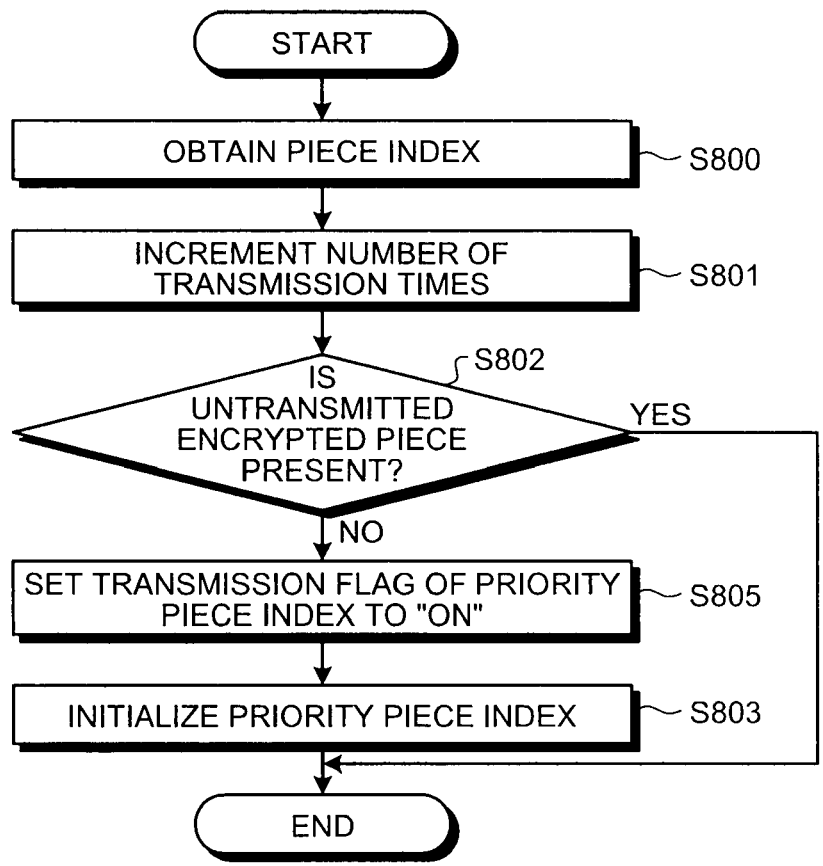

| NEW-PIECE REQUEST FLAG | VARIATION INDEX | PIECE INDEX | DATA STARTING POSITION | OBTAIN-DESIRED DATA LENGTH |
|---|---|---|---|---|
| OFF | i | j | 54677 | 54676 |

| NEW-PIECE REQUEST FLAG | VARIATION INDEX | PIECE INDEX | OBTAIN-DESIRED DATA LENGTH | PIECE INDEX LIST |
|---|---|---|---|---|
| ON | | | 54676 | {11,13,15,35,200, ...} |

COMMUNICATION APPARATUS, COMMUNICATION SYSTEM, TRANSMISSION METHOD, AND COMPUTER PROGRAM PRODUCT

CROSS-REFERENCE TO RELATED APPLICATIONS

This application is based upon and claims the benefit of priority from the prior Japanese Patent Application No. 2008-78239, filed on Mar. 25, 2008; the entire contents of which are incorporated herein by reference.

BACKGROUND OF THE INVENTION

1. Field of the Invention

The present invention relates to a communication apparatus, a communication system, a transmission method, and a computer program product, for transmitting an encrypted content encrypted by an encryption key, to other communication apparatus.

2. Description of the Related Art

In general, a system that distributes a content includes a "single-server type" and a "distributed-server type". In a single server system, one content server, a license server, and clients are connected to each other via a network, and the content server distributes a content to each client. The distributed content is encrypted, and the license server has key information concerning this encryption. The content server holds the content as E(KT)[C]. KT represents a key called a title key, and C represents a content of a plain text. E(KT)[C] indicates that C is encrypted by KT. The encryption information includes KT. A client B obtains key information from the license server, encrypts the key information using a key KB specific to the client (the client B), and holds the encrypted key information by relating this encrypted key information to the content E(KT)[C] received from the content server. The client B decrypts the key information using the key KB, extracts the title key KT, and decrypts E(KT)[C] using the title key KT, thereby using the content.

In this configuration, at the time of downloading the content E(KT)[C] from the content server, the client B performs authentication and key exchange with the content server. As a result, the client B shares a temporary key KtmpB. The content server encrypts the content E(KT)[C], using the temporary key KtmpB, and transmits a content E(KtmpB)[E(KT)[C]] to the client B. The client B decrypts the content E(KtmpB)[E(KT)[C]] using the temporary key KtmpB shared with the content server by the above authentication and key exchange, and extracts E(KT)[C]. In the configuration, even when the encrypted content E(KtmpB)[E(KT)[C]] is read out unjustly on the route of the network, the unjustly read encrypted content cannot be decrypted without the temporary key KtmpB. That is, by encrypting the content using a temporary key different for each client, the same content can be individualized for each client, thereby restricting an unauthorized use of the content. For example, by differentiating a temporary key KtmpA for a client A from the temporary key KtmpB for the client B, a content E(KtmpA)[E(KT)[C]] distributed to the client A and the E(KtmpB)[E(KT)[C]] distributed to the client B become mutually different data. By individualizing the same content using different encryption keys in this way, an unauthorized use of the content can be restricted.

However, according to the single-server system, a client and a content server communicate with each other at one to one. Therefore, when many clients attempt to receive distributed contents from the content server, the distribution efficiency becomes poor.

On the other hand, according to the distributed-server system, there is a content distribution system called BitTorrent based on the P2P, as shown in Bittorrent Protocol Specification v1.0. In this system, a tracker, a seeder, and a leecher different for each content are connected to each other based on the P2P. The distributed contents are divided into plural pieces. The seeder is a node for distributing the pieces constituting the content, to distribute (upload) the contents. The leecher is a node for receiving each piece constituting the content and for distributing the pieces constituting the content, to receive (download) the content. That is, when the leecher obtains some extent of pieces constituting the content, the leecher becomes a seeder in some cases. As explained above, the seeder includes a leecher that changes to a seeder after receiving total pieces or a part of pieces constituting the content, and a seeder prepared at the system side in advance or during distribution as a seeder from the beginning. The latter seeder is called an initial seeder. The initial seeder holds all pieces or a part of pieces that can constitute a certain content. Hereinafter, unless otherwise specified, a seeder means a seeder or an initial seeder, and a node means a leecher, a seeder, or an initial seeder. The tracker holds node information concerning each node, and provides node information to the leecher, when there is an access from the leecher.

In this configuration, when a certain leecher is going to receive distribution of a content, the leecher first obtains information called a Torrent File. A server (called a marketing server) that operates a service of selling a content to a content provider or a user gives the Torrent File to other node or a marketing server. Further, the other node or the marketing server gives the Torrent File to the leecher. A Torrent File recorded on a recording medium such as a compact-disk read only memory (CD-ROM) is also distributed to leechers in offline. The Torrent File stores tracker information concerning the content, and file information of the content. The tracker information includes a tracker connection destination. The file information includes hash information of each piece constituting the content. The hash information is used to confirm completeness of the pieces. That is, the hash information is used to calculate a hash of a piece downloaded by the leecher, compare the hash with a hash value of the piece, and confirm that the received piece is not tampered.

When the leecher obtains this Torrent File, the leecher connects to the tracker, based on tracker information. The tracker transmits the node information to the leecher. The node information includes a list of connection destinations of a single or plural nodes. The leecher connects to plural nodes based on the node information. Pieces distributed by the nodes are different for each node in many cases. Because the leecher can receive different pieces from the plural nodes, the leecher can receive a content at a high speed.

As explained above, according to the content distribution system based on the P2P, the content is held in dispersion in plural nodes. Therefore, in this system, even when there are many nodes that receive distributed contents, the nodes can receive distributed contents from plural other nodes based on the P2P. Consequently, the distribution efficiency is better than that of the single-server system.

To restrict unauthorized use of a content in the content distribution system capable of distributing contents from plural nodes, it is preferable to protect distributable contents by encryption. However, in this content distribution system, unlike in the single-server system, the same content each leecher receives from the seeder needs to be the same even in the encrypted state. Therefore, it is difficult to distribute contents individually encrypted for each leecher. Consequently, there is a risk that when one key to decrypt the encrypted content is exposed, many contents present in the network can be decrypted.

Particularly, when plural leechers exchange encrypted pieces with each other without via the server and the like, it is difficult to control the operation of each leecher obtaining the content. Accordingly, the influence of the exposure of the key is serious.

SUMMARY OF THE INVENTION

According to one aspect of the present invention, a communication apparatus that transmits a plurality of pieces as a part of a content, the apparatus includes a first storage unit that stores a plurality of encrypted pieces obtained by encrypting each of the pieces by an encryption key, and that stores a plurality of encrypted pieces obtained by encrypting at least one of first pieces among the pieces by a plurality of different encryption keys; a second storage unit that stores number of transmission times of each of the encrypted pieces stored in the first storage unit; a selecting unit that selects as priority pieces the encrypted pieces corresponding to at least one of the first pieces, based on number of untransmitted encrypted pieces of which number of transmission times is zero among the encrypted pieces of which the first piece is encrypted; a storage control unit that controls the second storage unit so that the second storage unit additionally stores priority piece information specifying a selected priority piece; a receiving receiving unit that receives a piece request requesting an encrypted piece, from other communication apparatus; a first determining unit that determines as transmission candidates the encrypted pieces specified as the priority pieces by the priority piece information, when the piece request is received; a second determining unit that determines at least one of the untransmitted encrypted pieces as an encrypted piece to be transmitted, among the encrypted pieces determined as transmission candidates; a transmitting unit that transmits the encrypted piece determined to be transmitted, to the other communication apparatus; a first updating unit that updates number of transmission times of each of the encrypted pieces stored in the second storage unit, in accordance with the encrypted piece transmitted by the transmitting unit; and a second updating unit that updates the priority piece information stored in the second storage unit, in the second storage unit, so that the priority piece becomes in an initial state not specified by the priority piece information, when the untransmitted encrypted piece is not present any more among the encrypted pieces specified as priority pieces by the priority piece information.

According to another aspect of the present invention, a communication system includes a first communication apparatus performing transmission and reception of a plurality of pieces as a part of a content; and a second communication apparatus performing transmission and reception of a plurality of pieces as a part of a content, the a first communication apparatus and the second communication apparatus being connected via a network, wherein each of the first communication apparatus and the second communication apparatus includes a first storage unit that stores a plurality of encrypted pieces obtained by encrypting each of the pieces by an encryption key, and that stores a plurality of encrypted pieces obtained by encrypting at least one of first pieces among the pieces by a plurality of different encryption keys, a second storage unit that stores number of transmission times of each of the encrypted pieces stored in the first storage unit, a selecting unit that selects as priority pieces the plurality of encrypted pieces corresponding to at least one of the first pieces, based on number of untransmitted encrypted pieces of which number of transmission times is zero among the encrypted pieces of which the first piece is encrypted, a storage control unit that controls the second storage unit so that the second storage unit additionally stores priority piece information specifying a selected priority piece a receiving unit that receives a piece request requesting an encrypted piece, from other communication apparatus, a first determining unit that determines as transmission candidates the encrypted pieces specified as the priority pieces by the priority piece information, when the piece request is received, a second determining unit that determines at least one of the untransmitted encrypted pieces as an encrypted piece to be transmitted, among the encrypted pieces determined as transmission candidates, a transmitting unit that transmits the encrypted piece determined to be transmitted, to the other communication apparatus, a first updating unit that updates number of transmission times of each of the encrypted pieces stored in the second storage unit, following the encrypted piece transmitted by the transmitting unit, a second updating unit that updates the priority piece information in the second storage unit, so that the priority piece becomes in an initial state not specified by the priority piece information, when the untransmitted encrypted piece is not present any more among the encrypted pieces specified as priority pieces by the priority piece information, a piece receiving unit that receives the encrypted piece from other communication apparatus, and a piece-storage control unit that controls the first storage unit so that the first storage unit stores the received encrypted piece, and wherein the transmitting unit included in the first communication apparatus transmits the encrypted piece determined to be transmitted, to the second communication apparatus, and the piece receiving unit included in the second communication apparatus receives the encrypted piece transmitted from the transmitting unit included in the first communication apparatus.

According to still another aspect of the present invention, a transmitting method implemented in a communication apparatus that transmits a plurality of pieces as a part of a content, and includes a first storage unit that is a storage unit storing a plurality of encrypted pieces obtained by encrypting each of the pieces by an encryption key, and that stores a plurality of encrypted pieces obtained by encrypting at least one of first pieces among the pieces by a plurality of different encryption keys, and a second storage unit that stores number of transmission times of each of the encrypted pieces stored in the first storage unit, the method includes selecting as priority pieces the encrypted pieces corresponding to at least one of the first pieces, based on number of untransmitted encrypted pieces of which number of transmission times is zero among the encrypted pieces of which the first piece is encrypted; controlling the second storage unit so that the second storage unit additionally stores priority piece information specifying a selected priority piece in the second storage unit; receiving a piece request requesting an encrypted piece from other communication apparatus; determining as transmission candidates the encrypted pieces specified as the priority pieces by the priority piece information, when the piece request is received; determining at least one of the untransmitted encrypted pieces as an encrypted piece to be transmitted, among the encrypted pieces determined as transmission candidates; transmitting the encrypted piece determined to be transmitted, to the other communication apparatus; updating number of transmission times of each of the encrypted pieces stored in the second storage unit, in accordance with the transmitted encrypted piece; and updating the priority piece information stored in the second storage unit, in the second storage unit, so that the priority piece becomes in an initial state not specified by the priority piece information, when the untransmitted encrypted piece is not present any more among the encrypted pieces specified as priority pieces by the priority piece information.

A computer program product according to still another aspect of the present invention causes a computer to perform the method according to the present invention.

BRIEF DESCRIPTION OF THE DRAWINGS

FIG. 4 is a diagram illustrating an example of each encrypted piece stored in a seeder;

FIG. 5 is a diagram illustrating an example of each encrypted piece stored in the seeder;

FIG. 6 is a diagram illustrating an example of each encrypted piece stored in the seeder;

FIG. 7 is a diagram illustrating an example of a functional configuration of a seeder;

FIG. 8 is a diagram illustrating an example of a data configuration of piece information;

FIG. 9 is a diagram illustrating an example of a data configuration of a transmission status table;

FIG. 24 is a diagram illustrating an example of a functional configuration of a seeder according to a second embodiment of the present invention;

FIG. 25 is a diagram illustrating an example of a data configuration of a transmission status table;

FIG. 29 is a flowchart of a procedure of a transmission-status-table update process;

FIG. 30 is a transmission status table according to a modification of the second embodiment;

DETAILED DESCRIPTION OF THE INVENTION

Exemplary embodiments of a communication apparatus, a communication system, a transmission method, and a computer program product according to the present invention will be explained below in detail with reference to the accompanying drawings.

Figure 1:
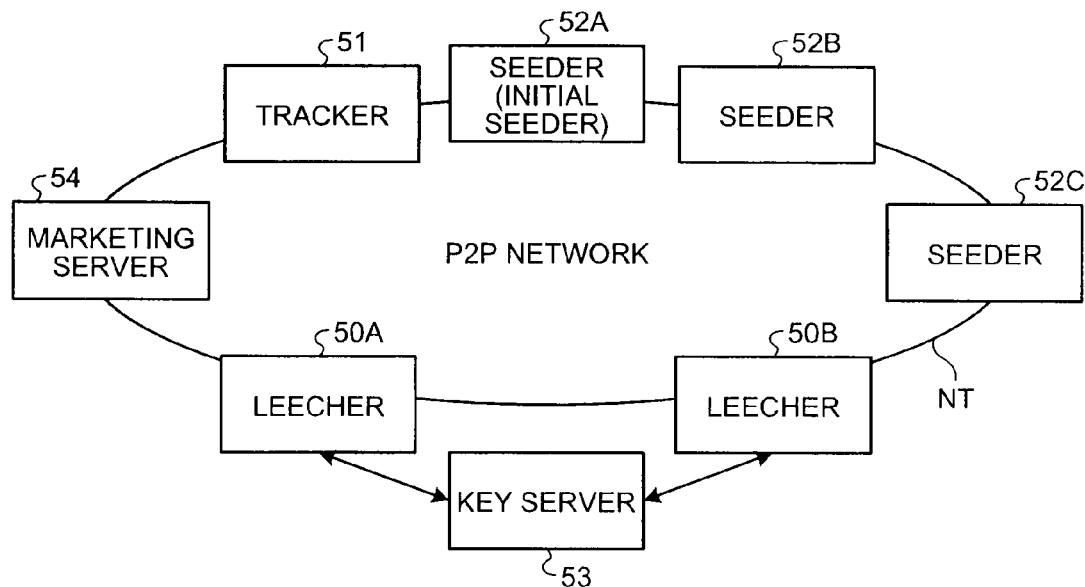
FIG. 1 is a block diagram illustrating a configuration of a content distribution system according to a first embodiment of the present invention.

FIG. 1 is a block diagram of a configuration of a content distribution system according to a first embodiment of the present invention. In the content distribution system according to the first embodiment, leechers 50A and 50B, a tracker 51, seeders 52A to 52C, and a marketing server 54 are connected to each other via a P2P network NT. The leechers 50A and 50B are connected to a key server 53 via a network (not shown) such as the Internet. In this example, nodes are the leechers 50A and 50B, and the seeders 52A to 52C. The seeders 52A to 52C hold encrypted pieces that are individually encrypted by different encryption keys, for a content divided into the plural pieces. The content including the encrypted pieces is hereinafter called an encrypted content. Detail of the encrypted content are described later. Among the seeders 52A to 52C, the seeder 52A functions as the above-described initial seeder. The seeder 52A holds all encrypted pieces generated by being individually encrypted using plural encryption keys for the same piece, for each piece constituting one content. The tracker 51 holds node information to access each node. The key server 53 holds a decryption key to decrypt each encrypted piece. The marketing server 54 holds a Torrent File.

The leecher 50A receives the Torrent File from the marketing server 54, obtains node information by accessing the tracker 51, based on the Torrent File, and receives each encrypted piece by accessing at least one of the seeders 52A to 52C and the leecher 50B. The leecher 50A obtains the all encrypted pieces corresponding to the all pieces, and receives from the key server 53 a key bunch including each decryption key to decrypt each encrypted piece. The leecher 50B performs a similar operation. When the leechers 50A and 50B are not required to be discriminated, these leechers are hereinafter simply described as leechers 50. When the seeders 52A to 52C are not required to be discriminated, these seeders are also hereinafter simply described as a seeder 52.

Figure 2:
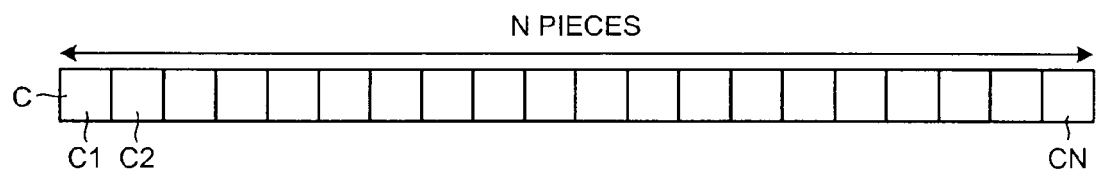
FIG. 2 is a schematic diagram illustrating a state that a content is divided into plural pieces.
Figure 3:
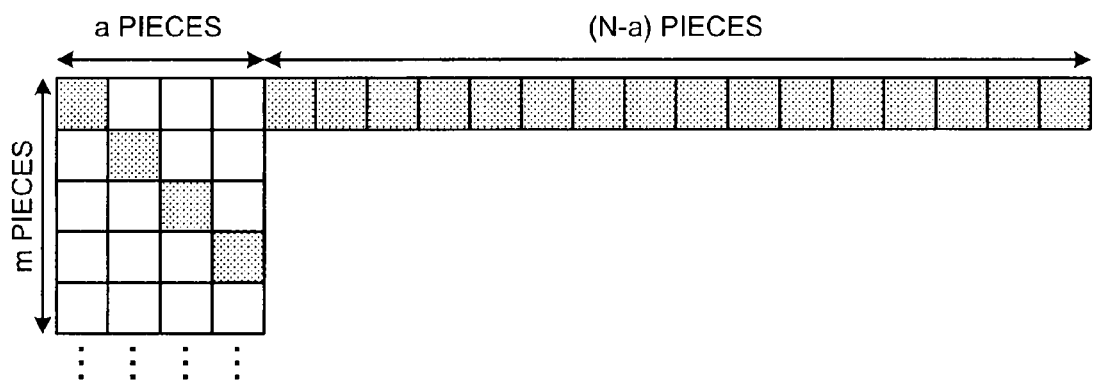
FIG. 3 is a schematic diagram illustrating each encrypted piece.

A configuration of a content is explained blow. The content refers to various kinds of digital data, such text data and still-image data in addition to motion-picture data and audio data such as the Motion Picture Experts Group (MPETG)2 and the MPEG4. These digital data that are encrypted are also called contents. For example, HD DVD Prepared Video Content that is encrypted following the Advanced Access Content System (AACS) specification is also a content. The all contents are expressed here as C. The C can be a plain text or encrypted. FIG. 2 is a schematic diagram illustrating a state that a content is divided into plural pieces. For example, the content C as one content C is divided into N (N>1) pieces C1 to CN. A data length of each of the pieces C1, C2, . . . , CN can be the same, or can be different. The N pieces C1 to CN are encrypted by mutually different encryption keys. In this case, among the N pieces, "a" pieces are encrypted using mutually different m (m>1) encryption keys for the same pieces. The rest (N−a) pieces are encrypted using one encryption key (a first encryption key) for the same piece. That is, for the "a" pieces, the same piece is encrypted using m different encryption keys to generate the different m pieces (encrypted pieces). For the (N-a) pieces, each piece is encrypted using one encryption key to generate one encrypted piece for one piece. FIG. 3 is a schematic diagram illustrating each encrypted piece. For each of the "a" pieces, a combination of encrypted pieces, each one encrypted piece selected from the m encrypted pieces, is differentiated, thereby individualizing the all encrypted contents including the N encrypted pieces.

Hardware configurations of the leecher 50, the tracker 51, the seeder 52, and the key server 53 are explained below. Each device includes a control device such as a central processing unit (CPU) that controls the total device, a storage device such as a ROM and a random access memory (RAM) that store various data and various programs, an external storage device such as a hard disk drive (HDD) and a compact disk (CD) drive device that store various data and various programs, and a bus that connects these devices. In this way, each device has a hardware configuration using a normal computer. Each device is connected to a display device that displays information, an input device such as a keyboard and a mouse that receives an input of instruction from a user, and a communication interface (I/F) that controls communication of the external device, by wire or wireless.

The configuration of the seeder 52 is explained in detail below. The seeder 52 stores the encrypted pieces of the plural pieces C1 to CN constituting the content C, by relating the pieces C1 to CN to indexes of decryption keys to decrypt the pieces C1 to CN. Each decryption key can be the same as each encryption key, or can be different from each encryption key. Because each of the pieces C1 to CN is encrypted by each encryption key, each encrypted piece can be specified using the index of each decryption key, for each decryption key to decrypt each encrypted piece. Each encrypted piece is stored in the external storage device, for example.

For simplicity, the following explanations are based on that the encryption key and the decryption key are the same. When the index of the decryption key is expressed by (i, j) and also when the decryption key is expressed by (i, j), each encrypted piece is expressed as follows, for example.
$E(K(i, j)) [Cj]$ (where, i and j are integers, and $1 \leq i \leq m$, $1 \leq j \leq N$ (m>1). For mutually different indexes (i,j) and (i',j'), $(i, j) \neq (i', j')$), $K(i, j)$ can be $K(i, j) = K(i', j')$).

The encrypted content configured by encrypted pieces is expressed as follows, for example.
$\{E(K(i1, 1))[C1], E(K(i2, 2))[C2], \ldots, E(K(iN, N))[CN]\}$ (where, $1 \leq i1, \ldots, iN \leq m$).

A sequence of encrypted pieces in this encrypted content is expressed by a combination of indexes of each encrypted piece, and is expressed as follows, for example. In this example, the indexes corresponding to the pieces C1 to CN are expressed sequentially from the left.
$\{(i1, 1), (i2, 2), \ldots, (iN, N)\}$ (where, $1 \leq i1, \ldots, iN \leq m$).

Therefore, a sequence that the seeder 52 stores each encrypted piece and the index by relating to each other can be expressed as follows, for example.
$\{(E(K(i1, 1))[C1], (i1, 1)), (E(K(i2, 2))[C2], (i2, 2)), (E(K(iN, N)[CN], (iN, N)))\}$ (where, $1 \leq i1, \ldots, iN \leq m$).

Hereinafter, the index j to distinguish between the pieces C1 to CN is expressed as a piece index, and the index generating a variation corresponding to the number of decryption keys is expressed as a variation index. A set of the index j and the index i is simply expressed as an index. Regarding a piece corresponding to the piece index j, when there is an encrypted piece encrypted by mutually different two or more encryption keys, a set of these encrypted pieces is appropriately described as an encrypted piece row j.

The seeder 52A as an initial seeder stores all encrypted pieces, each generated by encryption by plural encryption keys for the same piece, for each encrypted piece corresponding to each piece constituting the content. FIG. 4 is a diagram illustrating an example of each encrypted piece stored in the seeder 52A. FIG. 4 depicts a state that, for the "a" (1<a<N) pieces among the N pieces, the same piece is encrypted by mutually different encryption keys. In FIG. 4, the number of encryption keys used to encrypt the same piece is different for each piece. The number of encryption keys for the piece C1 is m, and the number of encryption keys for the piece C3 is two. However, in the first embodiment, the number of encryption keys used to encrypt the same piece can be the same for each piece. The piece processing device encrypts the same piece using mutually different plural encryption keys, for the "a" (1<a<N) pieces among the N pieces, thereby increasing the number of encryption keys for a piece having high importance.

In the first embodiment, the encryption of the pieces is not limited to the example described above. For example, as shown in FIG. 5, when "a=N", that is for all the N pieces, each piece can be encrypted using mutually different m encryption keys for the same piece. According to this configuration, many variations of the sequences of encrypted pieces can be provided. As shown in FIG. 6, when "a=1", that is, only one piece among the N pieces can be encrypted using mutually different m encryption keys. According to this configuration, the distribution efficiency can be improved.

The seeders 52B and 52C other than the seeder 52A as the initial seeder do not necessarily hold the all encrypted pieces present as the encrypted pieces belonging to the encrypted piece row j. When the seeders 52B and 52C hold only a part of encrypted pieces present as the encrypted pieces belonging to the encrypted piece row at a certain point of time, the corresponding part of the encrypted pieces are processed variously as the pieces to be processed. It is assumed that for at least one encrypted piece row j, the seeder 52 holds encrypted pieces encrypted by mutually different two or more encryption keys. At least the piece index is assumed to be shared between the seeder 52 (the transmitter side) including the seeder 52A and the leecher 50 after the seeder becomes the transmitter transmitting the encrypted piece, that is, between the transmitters. As described later, when the receiver side receiving the encrypted piece assigns a variation index, the variation index is also shared between the transmitter sides. This can be achieved when the transmitter sides share the same Torrent File. These seeders 52B and 52C can hold the all encrypted pieces present as the encrypted pieces belonging to the encrypted piece row j, by receiving the encrypted pieces from other seeder 52 or leecher 50.

Various functions that the CPU of the seeder 52 achieves by executing various programs stored in the storage device and the external storage device are explained next. FIG. 7 is a diagram illustrating an example of a functional configuration of the seeder 52. The seeder 52 includes a piece-information transmitting unit 520, a piece-request receiving unit 521, a priority-piece-index selecting unit 522, a piece-index determining unit 523, a variation-index determining unit 524, a transmission-status-table updating unit 525, and a piece transmitting unit 526. The seeder 52 has a transmission status table (not shown). The transmission status table is a data table stored in the external storage device, for example.

The piece-information transmitting unit 520 transmits to the leecher 50 piece information indicating a piece index of an encrypted piece stored in the seeder 52, based on the access from the leecher 50. FIG. 8 is a diagram illustrating an example of a data configuration of piece information. FIG. 8 depicts only piece indexes, and depicts that the seeder 52 has encrypted pieces corresponding to pieces C19, C29, C100, and C101. According to this configuration, a variation index of the encrypted piece (i, j) held by the seeder 52 can be hidden in the leecher 50. In this configuration, the leecher 50 can determine a sequence of the encrypted piece obtained by the leecher 50, by referencing the variation index value i described as header information at the time of receiving the information of the Torrent File and the encrypted piece. The seeder 52 can also transmit to the leecher 50 the piece information indicating a set (i, j) of the piece index j and the variation index i, not only the piece index j.

The piece-request receiving unit 521 receives a piece request from the leecher 50 requesting for an encrypted piece based on the piece information described above.

The transmission-status-table updating unit 525 counts the number of times of transmission of each encrypted piece stored in the seeder 52, and stores the number of transmission times in the transmission status table by relating this number to each encrypted piece. FIG. 9 is a diagram illustrating an example of a data configuration of the transmission status table. The transmission status table shown in FIG. 9 depicts piece indexes of the all pieces constituting a content, and all variation indexes present corresponding to the piece indexes. Among these indexes, the transmission-status-table updating unit 525 stores the number of transmission times corresponding to each index (i, j) of the encrypted piece stored in the seeder 52. In the transmission status table, a priority-piece index flag is related to each piece index. The priority-piece index flag specifies a piece index that the priority-piece-index selecting unit 522 explained below selects as a priority piece index, and this corresponds to priority piece information. A priority-piece index flag is set to "0" as an initial value. A piece index which is set to "1" shows that this piece index is selected as a priority piece index. When an initial condition of the priority piece index is established after the encrypted piece is transmitted, the transmission-status-table updating unit 525 sets the values of the priority-piece index flags of the all piece indexes to "0", thereby initializing the priority piece index. That is, when the initialization condition of the priority piece indexes is established, the transmission-status-table updating unit 525 sets the priority piece indexes to the initial state in which the priority piece indexes are not specified by the priority-piece index flag. The initialization condition of the priority piece index means that there is no encrypted piece not yet transmitted among the encrypted pieces belonging to the encrypted piece row corresponding to the piece index selected as a priority piece index. This means that there is no encrypted piece of which number of transmission times is zero. That the number of transmission times is zero does not mean that the transmission record is zero, but this means that a certain time has passed since the last distribution, or that distribution is started by setting the number of transmission times to zero based on a policy of the distribution side. For example, the setting can be done based on a determination such that distribution is not confirmed in the P2P network NT.

The priority-piece-index selecting unit 522 references the transmission status table, and counts the number of untransmitted encrypted pieces among the encrypted pieces stored in the seeder 52, that is, the number of the encrypted pieces of which number of transmission times is "0", for each encrypted piece row. With this arrangement, the priority-piece-index selecting unit 522 selects as the priority piece index the piece index j of the encrypted piece row having the largest number of untransmitted encrypted pieces. That is, plural encrypted pieces included in the encrypted piece row of the piece index j selected as the priority piece index is selected as the priority piece. The priority piece is a piece distributed with priority among plural encrypted pieces encrypted by different encrypted keys. The priority-piece-index selecting unit 522 sets to "1" a priority-piece index flag corresponding to the piece index selected as the priority piece index in the transmission status table. The number of the priority piece index can be plural. In this case, the priority-piece-index selecting unit 522 selects priority piece indexes in the order of a large number of untransmitted encrypted pieces.

When the piece-request receiving unit 521 receives a piece request, the piece-index determining unit 523 references the priority-piece index flag in the transmission status table, and determines whether the piece index j selected as the priority piece index is present. When a result of the determination is affirmative, the piece index j of the encrypted piece to be set as a transmission candidate is determined. The variation-index determining unit 524 determines the variation index i of the encrypted piece to be transmitted, from among the variation indexes of the encrypted pieces belonging to the encrypted piece row corresponding to the piece index j determined by the piece-index determining unit 523 and held in the variation-index determining unit 524. As a result, the index (i, j) including a set of the piece index j and the variation i is determined, and the encrypted piece corresponding to the index (i, j) is determined to be transmitted.

The piece transmitting unit 526 transmits to the leecher 50 the encrypted piece corresponding to the index (i, j) including a set of the piece index j determined by the piece-index determining unit 523 and the variation index i determined by the variation-index determining unit 524.

Figure 10:
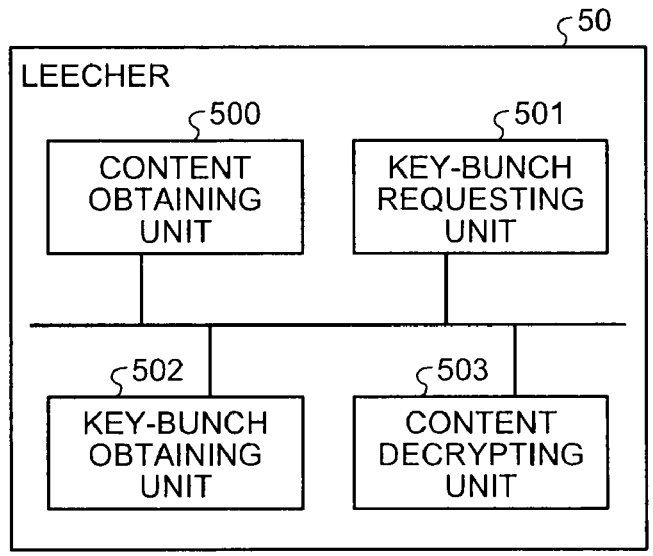
FIG. 10 is a diagram illustrating an example of a functional configuration of the leecher.

Next, various functions achieved by the CPU of the leecher 50 by executing various programs stored in the storage device and the external storage device in the above hardware configuration, are explained. FIG. 10 is a diagram illustrating an example of the functional configuration of the leecher 50. The leecher 50 includes a content obtaining unit 500, a key-bunch requesting unit 501, a key-bunch obtaining unit 502, and a content decrypting unit 503. A substance of each unit is generated on the storage device such as a RAM when the CPU executes the program.

Figure 11:
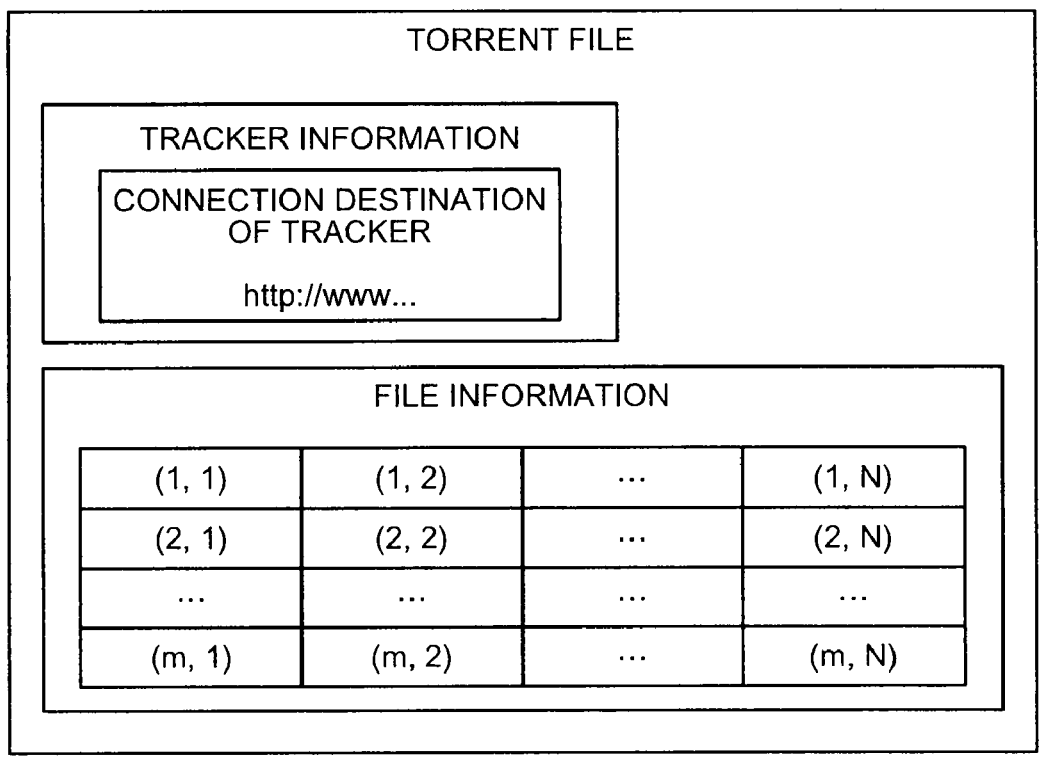
FIG. 11 is a diagram illustrating an example of a Torrent File.

The content obtaining unit 500 receives each encrypted piece constituting the encrypted content, from at least one of the seeders 52, via the P2P network NT. Specifically, the content obtaining unit 500 first obtains a Torrent File from the marketing server 54. The Torrent File includes tracker information containing tracker connection-destination information to connect to the tracker 51, and file information indicating each encrypted piece constituting the encrypted content. FIG. 11 is a diagram illustrating an example of the Torrent File. FIG. 11 depicts as the file information, indexes corresponding to the encrypted pieces as information to specify each encrypted piece.

The content obtaining unit 500 accesses the tracker 51 via the P2P network NT, based on the Torrent File, and receives from the tracker 51 node information to access nodes (the seeder 52, and other leechers 50) connected to the P2P network NT. A detail of the node information is described later. The content obtaining unit 500 accesses at least one node based on node information, and obtains piece information indicating a sequence of the encrypted piece held in the content obtaining unit 500. The content obtaining unit 500 receives each encrypted piece constituting the encrypted content, from at least one node, based on the piece information, and obtains the all encrypted pieces (a piece sequence) constituting the encrypted content. For example, the content obtaining unit 500 obtains all meshed encrypted pieces as the piece sequence, among the encrypted pieces shown in FIG. 3.

The key-bunch requesting unit 501 transmits to the key server 53 a request message requesting a key bunch to decode the piece sequence. The key bunch includes each decryption key to decrypt each encrypted key of the piece sequence, by matching the sequence of each decrypted piece. A detail of the key bunch and the decryption key is described later. The request message includes index information indicating a combination (a sequence) of the indexes of the encrypted pieces in the piece sequence, as the information to assign the sequence of each decryption key included in the key bunch. This sequence is expressed as follows, for example. $\{(i1, 1), (i2, 2), \ldots, (iN, N)\}$ (where, $i \leq i1, \ldots, iN \leq m$).

The key-bunch obtaining unit 502 receives the key bunch transmitted from the key server 53 corresponding to the request message. The content decrypting unit 503 decrypts each encrypted piece obtained by the content obtaining unit 500, using the decryption key corresponding to each encrypted key included in the key bunch obtained by the key-bunch obtaining unit 502, thereby obtaining the content configured by the decrypted pieces.

As described above, the leecher 50 can also function as a seeder. Because the functional configuration of the leecher 50 is described in the configuration of the seeder 52, explanations thereof will be omitted. When the leecher 50 functions as a seeder, the leecher 50 holds encrypted pieces corresponding to at least two pieces among the pieces C1 to CN. The leecher 50 holds encrypted pieces encrypted by two or more encryption keys. Further, for at least one of the encrypted pieces described above, the leecher 50 holds these encrypted pieces encrypted by mutually different two or more encryption keys.

Figures 12, 13:
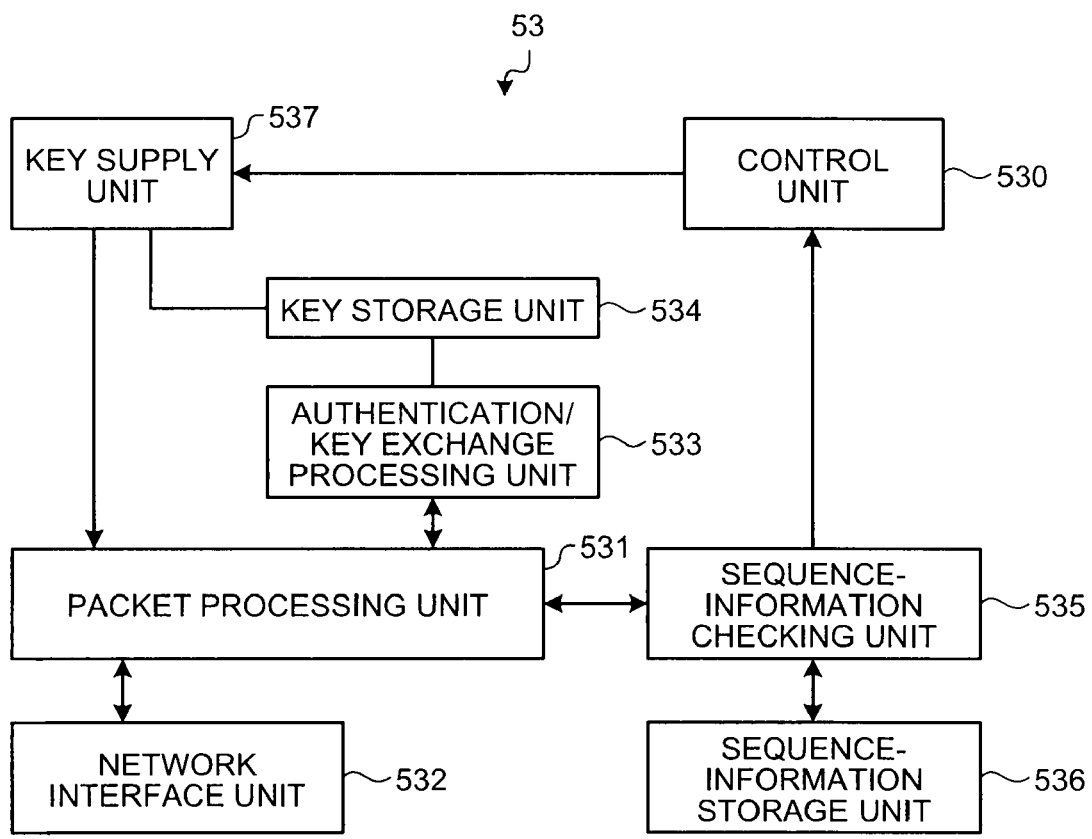
FIG. 12 is a diagram illustrating an example of a functional configuration of a key server.
FIG. 13 is a diagram illustrating an example of a data configuration of node information.

Various functions achieved by the CPU of the key server 53 by executing various programs stored in the storage device and the external storage device are explained next. FIG. 12 is a diagram illustrating an example of the functional configuration of the key server 53. The key server 53 includes a control unit 530, a packet processing unit 531, a network interface unit 532, an authentication/key exchange processing unit 533, a key storage unit 534, a sequence-information storage unit 536, a sequence-information checking unit 535, and a key supply unit 537. Substances of the control unit 530, the sequence-information checking unit 535, the network interface unit 532, the packet processing unit 531, the authentication/key exchange processing unit 533, and the key supply unit 537 are generated on the storage device such as a RAM, when the CPU executes a program. The key storage unit 534 is stored in the external storage unit, for example.

The control unit 530 controls the total of the key server 53, and intervenes in an instruction from the sequence-information checking unit 535 to the key supply unit 537. The packet processing unit 531 processes into a packet, various data to be transmitted to the external device such as the leecher 50, distributes the data packet to the network interface unit 532, and obtains data based on the packet distributed from the network interface unit 532. The network interface unit 532 controls communication with the external device, transmits the data packet distributed from the packet processing unit 531, and distributes the packet received from the external device to the packet processing unit 531.

The authentication/key exchange processing unit 533 performs mutual authentication with the leecher 50 via the network interface unit 532, and receives index information from the leecher 50 after the authentication.

The key storage unit 534 is configured by the external storage device such as an HDD, and stores each decryption key to decrypt each encrypted piece. Each encryption key is expressed by $K(i, j)$ as described above, for example.

The sequence-information storage unit 536 is configured by the external storage device such as an HDD, and stores the sequence information indicating sequences corresponding to the all key bunches transmitted to the leecher 50 in the past. The sequences corresponding to the key bunches are expressed as follows, like the sequences shown in the index information described above.
$\{(i1, 1), (i2, 2), \ldots, (iN, N)\}$ (where, $1 \leq i1, \ldots, iN \leq m$).

The sequence-information checking unit 535 compares the sequence information stored in the sequence-information storage unit 536 with the index information received from the leecher 50, and determines whether to transmit a key bunch corresponding to the sequence shown by the index information. Specifically, when the sequence information indicating the same sequence as the sequence shown in the index information is not stored in the sequence-information storage unit 536, the sequence-information checking unit 535 determines to transmit a key bunch corresponding to the sequence shown by the index information. The key bunch is expressed as follows, for example. In this example, decryption keys corresponding to the pieces C1 to CN are laid out from the left in order.
$\{K(i1, 1), K(i2, 2), \ldots, K(in <N)\}$ (where, $1 \leq i1, \ldots, iN \leq m$)

When the sequence-information checking unit 535 determines to transmit the key bunch, the sequence-information checking unit 535 instructs the key supply unit 537 to transmit the key bunch to the leecher 50, via the control unit 530. When the sequence-information checking unit 535 determines not to transmit the key bunch, the sequence-information checking unit 535 instructs the key supply unit 537 to prohibit transmitting the key bunch to the leecher 50, via the control unit 530.

When the key supply unit 537 is instructed by the sequence-information checking unit 535 via the control unit 530 to transmit the key bunch, the key supply unit 37 reads the decryption key corresponding to the key bunch sequence from the key storage unit 534, and transmits the key bunch including the read decryption keys to the leecher 50 via the network interface unit 532.

A configuration of the tracker 51 is explained next. When the leecher 50 accesses the tracker 51, the tracker 51 transmits to the leecher 50 node information to access the node connected to the P2P network NT. The node information includes a set of the IP address and a port number of each node. FIG. 13 is a diagram illustrating an example of a data configuration of the node information. FIG. 13 is a diagram illustrating an example of a data configuration of the node information. In FIG. 13, each of nodes A and B is either one of the leechers 50A and 50B and the seeders 52A to 52C. FIG. 13 depicts a set of the IP address and the port number of each node.

Figure 14:
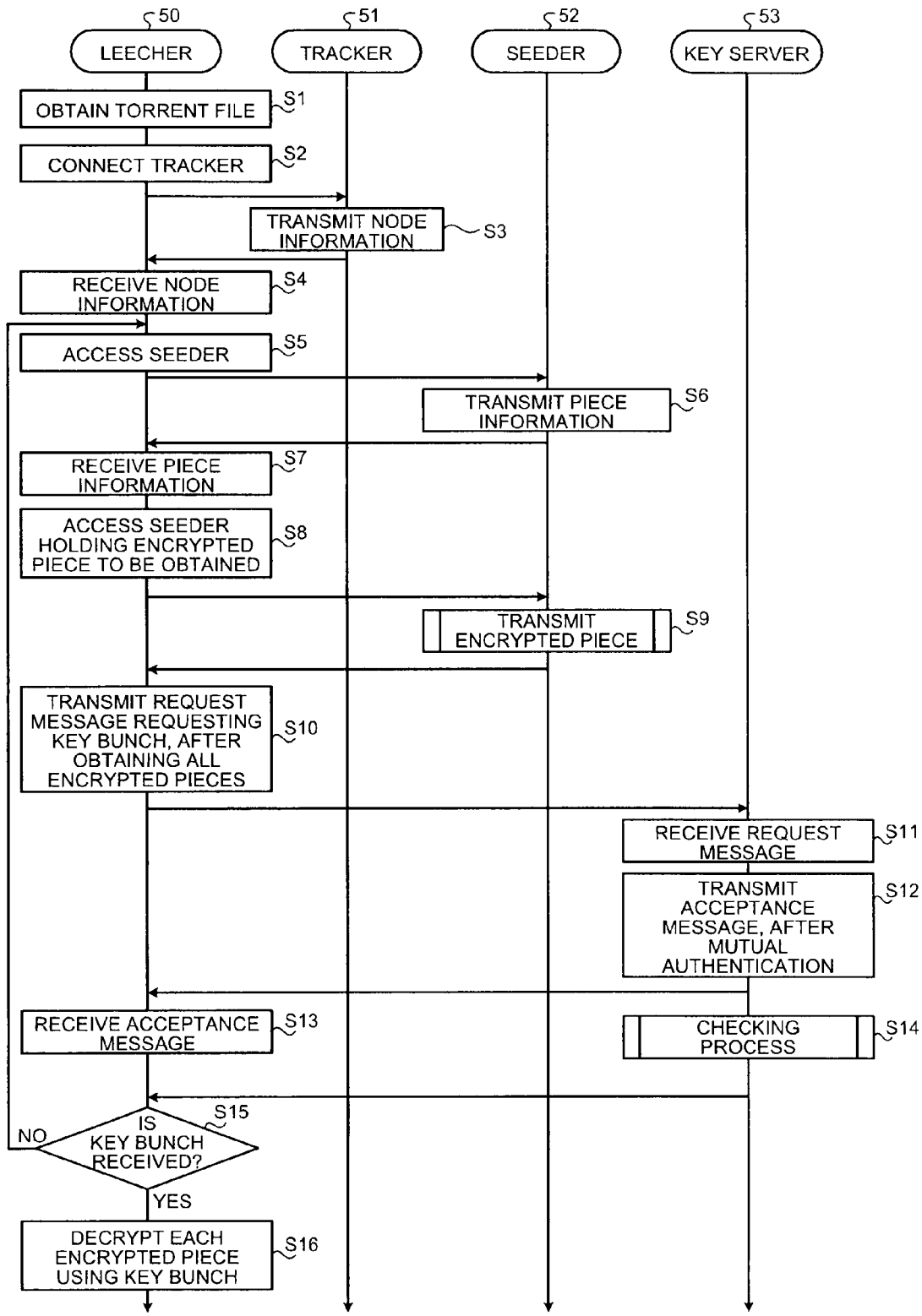
FIG. 14 is a flowchart of a procedure of a content distribution process.

A procedure of the content distribution process performed by the content distribution system according to the first embodiment is explained next with reference to FIG. 14. While the leecher 50 can also receive the encrypted piece from other leecher 50, for the sake of explanation, the leecher 50 receives the encryption key from at least one of the seeders 52A to 52C.

The leecher 50 first accesses the marketing server 54, and obtains a Torrent File (Step S1). When the leecher 50 accesses the tracker 51 using tracker connection-destination information included in the tracker information included in the Torrent File (Step S2), the tracker 51 transmits node information to the leecher 50 (Step S3). When the leecher 50 receives the node information (Step S4), the leecher 50 accesses at least one of the seeders 52A to 52C using the node information (Step S5). When the leecher 50 accesses the seeder 52, the seeder 52 transmits to the leecher 50 piece information indicating a piece index of the encrypted piece held by the seeder 52, as shown in FIG. 8 (Step S6). When the leecher 50 receives the piece information (Step S7), the leecher 50 accesses the seeder 52 that transmits the piece information indicating at least the piece index of the piece to be obtained (Step S8). The leecher 50 transmits to the seeder 52 a piece request requesting an encrypted piece. On the other hand, the seeder 52 performs a priority-piece-index selection process. When the seeder 52 receives the piece request from the leecher 50, the seeder 52 performs an encrypted-piece transmission process corresponding to the piece request (Step S9).

Figure 15:
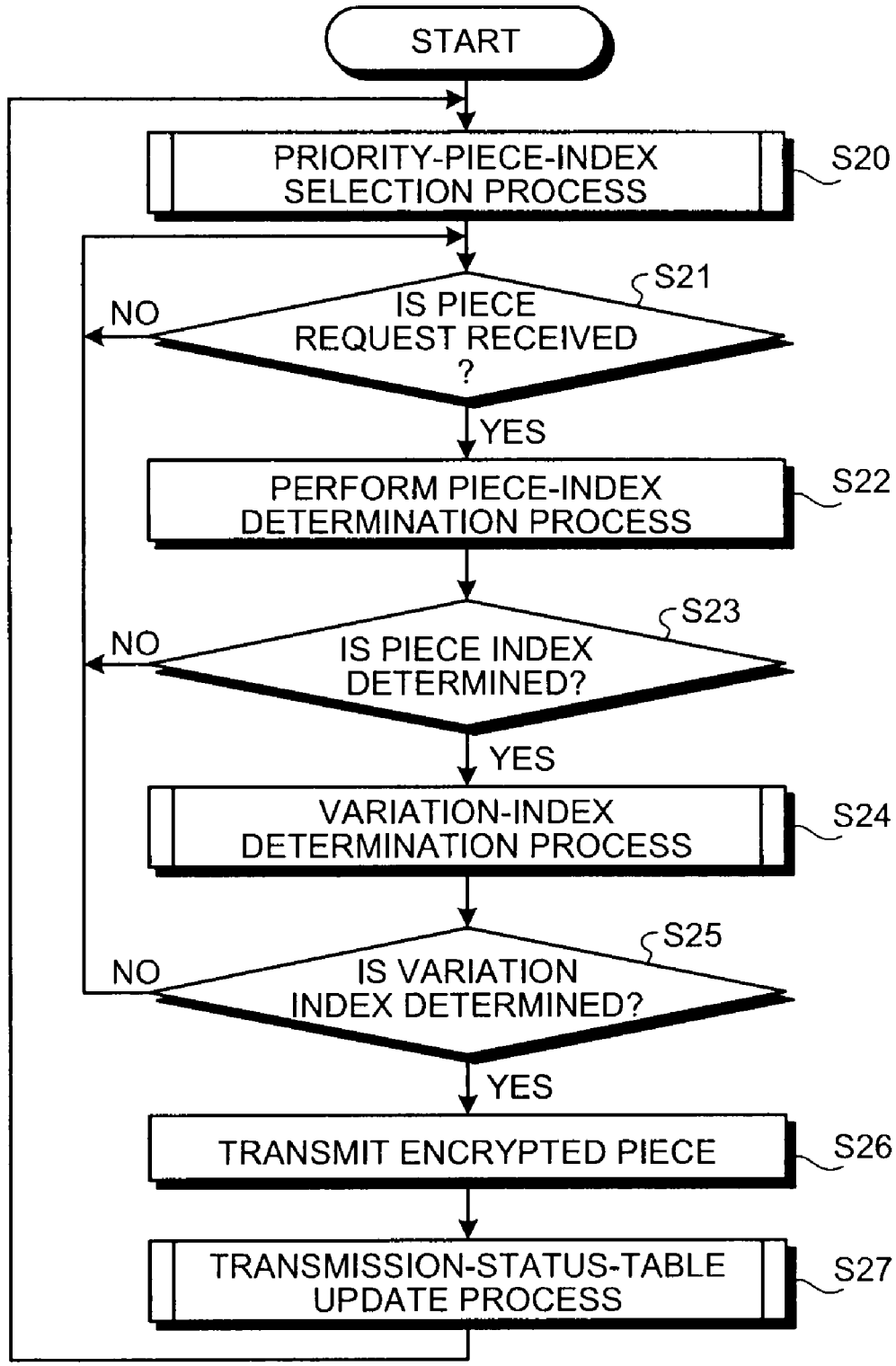
FIG. 15 is a flowchart of procedures of a priority-piece-index selection process and an encrypted-piece transmission process.
Figure 16:
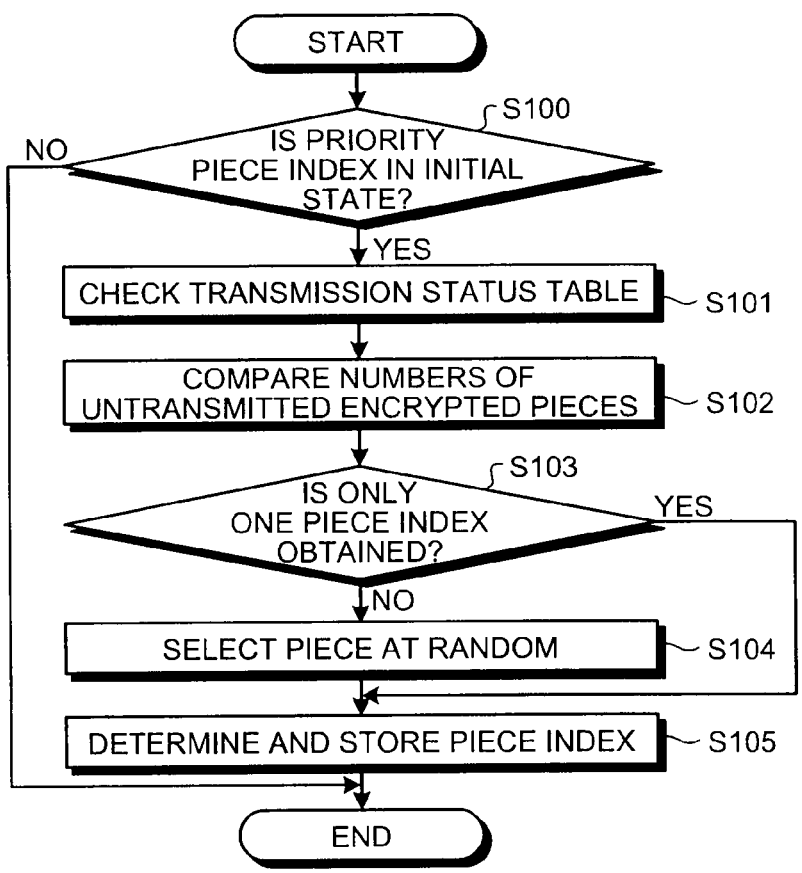
FIG. 16 is a flowchart of a detailed procedure of a priority-piece-index selection process.

The priority-piece-index selection process and the encrypted-piece transmission process performed by the seeder 52 are explained below with reference to FIG. 15. The seeder 52 first performs the priority-piece-index selection process (Step S20). FIG. 16 is a flowchart of a detailed procedure of the priority-piece-index selection process. The seeder 52 references the transmission status table, and determines whether the priority piece index is in the initial state, that is, whether the priority-piece index flag "1" is set (Step S100). When a result of the determination is negative, that is, when it is determined that the priority piece index is not in the initial state, the seeder 52 uses the priority-piece index flag already set. Therefore, the seeder 52 ends the priority-piece-index selection process. When a result of the determination is affirmative, that is, when it is determined that the priority piece index is in the initial state, the seeder 52 references the number of transmission times of the encrypted piece row j of each piece index j in the transmission status table (Step S101), and counts the number of untransmitted encrypted pieces among the encrypted pieces belonging to the encrypted piece row for each encrypted piece row. The seeder 52 searches a piece index of the largest number of the untransmitted encrypted pieces counted for each encrypted piece row (Step S102). When there is no encrypted piece row having untransmitted encrypted pieces, this means that the seeder 52 transmits the all encrypted pieces held by the seeder 52 at this stage. In this case, the seeder 52 can provide the leecher 50 with the encrypted piece corresponding to the piece request, or can stop the provision of the encrypted piece, without based on the above system. Thereafter, when an untransmitted encrypted piece is added in a certain path, the seeder 52 can select a piece index of the encrypted piece as the priority piece index, and restart the provision of the encrypted piece.

After Step S102, the seeder 52 determines whether the piece index obtained by search is the only piece index (Step S103). When a result of the determination is affirmative, the seeder 52 selects this piece index as the priority piece index (Step S105). The seeder 52 sets to "1" the priority-piece index flag corresponding to the piece index selected as the priority piece index, in the transmission status table. When a result of the determination at Step S103 is negative, this means that there are plural pieces of the same number of untransmitted encrypted pieces, and that plural candidates of priority piece indexes are available. In this case, the seeder 52 selects at random one piece index among these piece indexes (Step S104), and selects this as the priority piece index. The seeder 52 sets a value of the priority-piece index flag in the transmission status table in a manner similar to the above (Step S105).

Referring back to FIG. 15, thereafter, when the seeder 52 receives a piece request from the leecher 50 (YES at Step S21), the seeder 52 performs the encrypted-piece transmission process. In the encrypted-piece transmission process, the seeder 52 first performs the piece-index determination process (Step S22). In this process, the seeder 52 determines, as a candidate piece index of the encrypted piece to be transmitted to the leecher 50, the priority piece index, that is, the piece index having "1" set to the priority-piece index flag in the transmission status table.

The seeder 52 determines whether the transmission candidate of the piece index of the encrypted piece is determined (Step S23). When a result of the determination is affirmative, the seeder 52 performs a variation-index determination process (Step S24). When a result of the determination at Step S23 is negative, the seeder 52 transmits to the leecher 50 a notification message indicating that the encrypted piece is not transmitted, and waits for a new-piece request. The seeder 52 does not need to transmit a notification message to the leecher 50. In this case, a processing load of the seeder 52 can be decreased.

Figure 17:
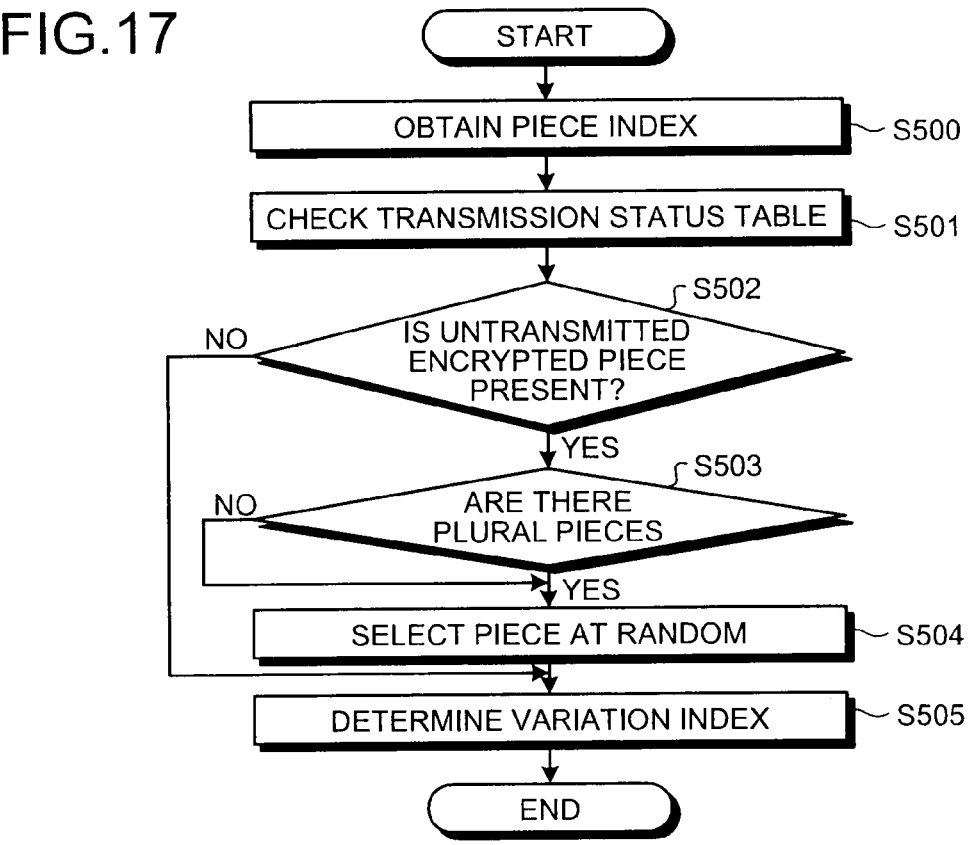
FIG. 17 is a flowchart of a procedure of a variation-index determination process.

FIG. 17 is a flowchart of a procedure of the variation-index determination process. The seeder 52 first obtains the piece index determined in the piece-index determination process described above (Step S500). The seeder 52 references the transmission status table using the piece index as a key (Step S501), and determines whether an untransmitted encrypted piece is present in the encrypted piece row of the piece index (Step S502). When a result of the determination is negative, the seeder 52 does not determine a variation index, and ends the variation-index determination process. The determination at Step S502 is performed to make accurate determination as to whether an untransmitted encrypted piece is present when the seeder 52 performs the encrypted-piece transmission process in parallel to many leechers. However, this determination can be omitted when the encrypted-piece transmission process is not carried out to many leechers.

When a result of the determination at Step S502 is affirmative, the seeder 52 confirms the number of untransmitted encrypted pieces in the untransmitted encrypted piece of the piece index obtained at Step S500 (Step S503). When there is one untransmitted encrypted piece, that is, when the variation index is determined as only one, the seeder 52 determines the variation index of the untransmitted encrypted piece as the variation index of the encrypted piece to be transmitted (Step S505). The seeder 52 ends the variation-index determination process. When there are plural untransmitted encrypted pieces at Step S503, the seeder 52 selects at random one variation index among the variation indexes of the untransmitted encrypted pieces (Step S504), and determines this variation index as the variation index of the encrypted piece to be transmitted (Step S505). The seeder 52 ends the variation-index determination process. When there are plural candidate variation indexes, the seeder 52 can select one variation index among the plural candidate variation indexes, not at random, but based on a distribution state of the P2P network NT of the encrypted pieces corresponding to the candidate variation index.

Referring back to FIG. 15, the seeder 52 determines whether the external storage device actually stores the encrypted piece corresponding to the index (i, j) including a set of the piece index j determined at Step S22 and the variation index i determined at Step S24 (Step S25). When a result of the determination is affirmative, the seeder 52 reads the encrypted piece from the external storage device, and transmits this to the leecher 50 (Step S26). When a result of the determination at Step S25 is negative, the seeder 52 transmits to the leecher 50 a notification message indicating that the encrypted piece is not transmitted, and waits for a new-piece request. In this case, the leecher 52 does not need to transmit the notification message to the leecher 50.

Figure 18:
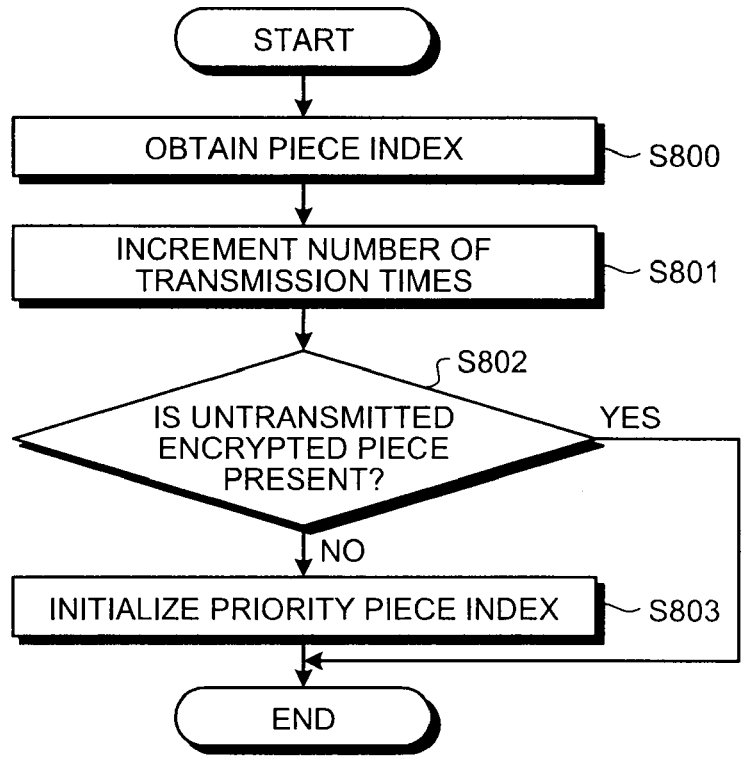
FIG. 18 is a flowchart of a procedure of a transmission-status-table update process.

After Step S26, the seeder 52 updates the transmission status table corresponding to the transmitted encrypted piece (Step S27). FIG. 18 is a flowchart of a procedure of the transmission-status-table update process. The seeder 52 obtains the piece index j and the variation index i of the transmitted encrypted piece (Step S800), and increases by one the number of transmission times corresponding to the index (i, j) in the transmission status table (Step S801). The seeder 52 determines whether the initialization condition of the priority piece index is established. Specifically, the seeder 52 determines whether there is an untransmitted encrypted piece corresponding to the priority piece index, that is, whether there is an encrypted piece of the number of transmission times as "0" in the encrypted piece row of the piece index having "1" set to the priority-piece index flag (Step S802). When a result of the determination is affirmative, the seeder 52 ends the transmission-status-table update process. When a result of the determination at Step S802 is negative, that is, when there is no untransmitted encrypted piece corresponding to the priority piece index, the seeder 52 sets "0" to the value of the priority-piece index flag corresponding to the all piece indexes in the transmission status table, thereby initializing the priority piece index (Step S803). The seeder 52 then ends the transmission-status-table update process.

On the other hand, when the leecher 50 receives an encrypted piece from the seeder 52, the leecher 50 accesses the other leecher (for example, a seeder 53C), when the leecher 50 does not obtain encrypted pieces corresponding to the all pieces C1 to CN constituting the content. The leecher 50 then obtains the piece information from the other seeder 53C. The leecher 50 accesses the other seeder 52 using the piece information in a manner similar to the above, and attempts to obtain the encrypted piece. The leecher 50 repeats the above process to obtain the encrypted content {E(K(i1, 1))[C1], E(K(i2, 2))[C2], . . . , E(K(iN, N))[CN]}. When the leecher 50 cannot receive the encrypted piece from the other communication party such as a specific seeder 52 and other leecher 50, the leecher 50 can request the other communication party the same encrypted piece, or request the same communication party a different encrypted piece.

When the leecher 50 obtains each encrypted piece corresponding to each piece constituting the content and the all encrypted pieces corresponding to the pieces constituting the encrypted content, the leecher 50 transmits to the key server 53 the request message requesting the key bunch including each decryption key to decrypt each encrypted piece (Step S10). This request message includes the index information {(i1, 1)), . . . , (iN, N)} indicating a sequence corresponding to each decryption key.

When the authentication/key exchange processing unit 533 of the key server 53 receives the request message via the network interface unit 532 (Step S11), the authentication/key exchange processing unit 533 mutually authenticates with the leecher 50. When the authentication is successful, the authentication/key exchange processing unit 533 transmits to the leecher 50 an acceptance message indicating the acceptance of the request (Step S12). When the leecher 50 receives the acceptance message from the key server 53 (Step S13), the leecher 50 waits for the transmission of the key bunch from the key server 53.

Figure 19:
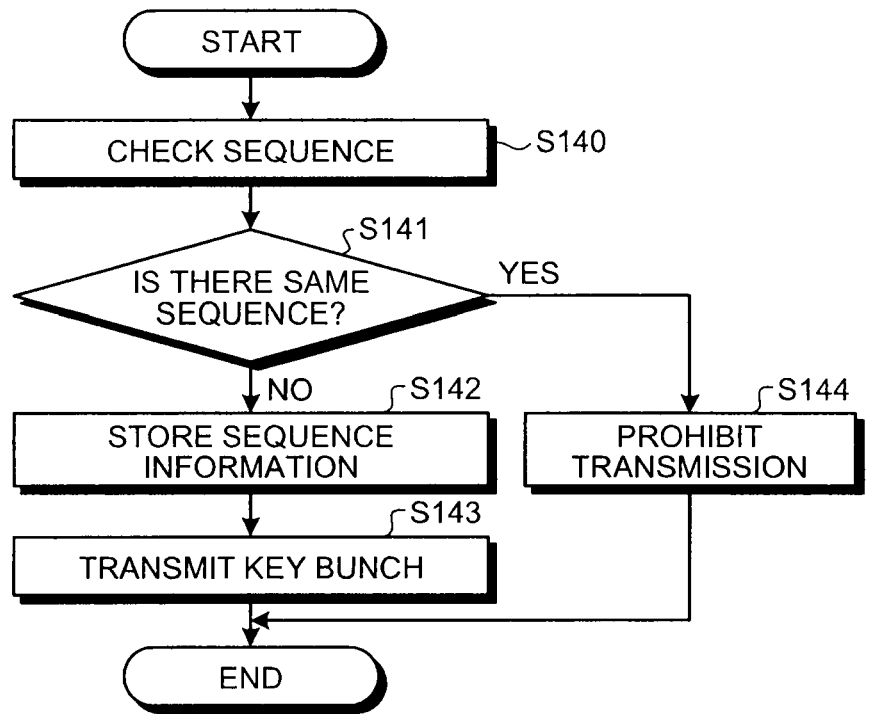
FIG. 19 is a flowchart of a procedure of a checking process.

On the other hand, the sequence-information checking unit 535 of the key server 53 performs a checking process using the index information included in the request message received at Step S11 (Step S14). FIG. 19 is a flowchart of a procedure of the checking process. In the checking process, the sequence-information checking unit 535 compares the index information included in the request message received at Step S11 with the sequence information stored in the sequence-information storage unit 536 (Step S140), and determines whether the sequence information indicating the same as the sequence shown in the index information is stored in the sequence-information storage unit 536 (Step S141). That is, the sequence-information checking unit 535 determines whether the key bunch requested by the leecher 50 is transmitted in the past to any one of the leechers 50.

When a result of the determination is negative (NO at Step S141), the sequence-information checking unit 535 determines to transmit the key bunches {K(i1, 1), K(i2, 2), . . . , K(iN, N)} corresponding to the sequence shown in the index information. The sequence-information checking unit 535 instructs the key supply unit 537 to transmit the key bunch to the leecher 50, via the control unit 530. The sequence-information checking unit 535 stores the sequence information indicating the sequence, in the sequence-information storage unit 536 (Step S142). The key supply unit 537 reads from the key storage unit 534 the key bunch of which transmission is instructed by the sequence-information checking unit 535 via the control unit 530, and transmits the key bunch to the leecher 50 via the network interface unit 532 (Step S143). When a result of the determination at Step S141 is affirmative, the sequence-information checking unit 535 determines not to transmit the key bunch, and instructs the key supply unit 537 to prohibit the transmission of the key bunch to the leecher 50 (Step S144).

Referring back to FIG. 14, when the leecher 50 receives the key bunches {K(i1, 1), K(i2, 2), . . . , K(iN, N)} from the key server 53 (YES at Step S15), the leecher 50 decrypts encrypted pieces E(K(i1, 1))[C1], E(K(i2, 2))[C2], . . . E(K(iN, N))[CN]) (Step S16), obtains the decrypted pieces C1 to CN, and obtains the content C constituted by these decrypted pieces C1 to CN. The leecher 50 decrypts E(K(i1, 1))[C1] using the decryption key K(i1, 1) to obtain the piece C1, decrypts E(K(i2, 2))[C2] using the decryption key K(i2, 2) to obtain the piece C2, and decrypts E(K(iN, N))[CN] using the decryption key K(iN, N) to obtain the piece CN. The leecher 50 similarly obtains other pieces, and obtains the content C constituted by the pieces C1 to CN.

When the leecher 50 does not receive the key bunch at Step S15 and receives an error message transmitted from the key server 53 at Step S143 in FIG. 1, the leecher 50 cannot decrypt each piece obtained at Step S10, and cannot use the content as a result. In this case, the process returns to Step S5. The leecher 50 obtains each encrypted piece in a sequence different from the sequence obtained at Step S10, and thereafter, performs again the processes after Step S10.

As described above, at the time of distributing the same content to plural leechers 50 via the P2P network NT, the key server 53 determines whether to transmit the key bunch using the sequence of the encrypted piece. When the key server 53 avoids the reuse of the sequence already used, the key server 53 can individualize the content for each leecher 50. Even if one key bunch is leaked out, only the encrypted content corresponding to the key bunch can be decrypted. Therefore, the reuse of the content can be restricted. By using the sequence determined by the encrypted piece that the leecher 50 optionally obtains, flexible content distribution corresponding to the environment of the P2P network NT can be achieved.

In the above explanations, while the seeder 52 performs the transmission of the encrypted piece corresponding to the piece request from the leecher 50, the seeder 52 transmits the all untransmitted encrypted pieces with priority, for the encrypted pieces held by the seeder 52. That is, in transmitting to other communication apparatus pieces as a part of the encrypted content distributed in the content distribution system, the seeder 52 does not provide other piece until when the all encrypted pieces held by the seeder 52 among the plural encrypted pieces, each of the same pieces encrypted by plural mutually different keys, are transmitted. Based on this configuration, it is possible to increase the possibility that the encrypted pieces that the plural leechers 50 obtain from the seeder 52 at the same time are the encrypted pieces of the same piece index. Therefore, the sharing of the pieces by the leechers can be restricted. Because it is costly for the leecher to obtain again the encrypted piece that is already held by this leecher, the sharing or exchange of the encrypted pieces is usually performed by the other party providing the encrypted piece of the piece index that is not held by the leecher. Therefore, according to the configuration in the first embodiment, the opportunity of sharing or exchanging the encrypted pieces among the leechers can be decreased before the variation of the encrypted piece to the same piece can be provided. That is, the opportunity that the piece encrypted by plural mutually different encrypted keys is transmitted increases, and the variation of the encrypted pieces present on the P2P network NT can be increased. As a result, a possibility that each leecher 50 obtains mutually different encrypted piece can be increased. Consequently, the influence of a leakage of a key of the distributed encrypted content can be decreased.

While the first embodiment has been explained above, various modifications or improvements can be added thereto.

In the first embodiment, the Torrent File is not limited to the explained one. For example, file information can include a hash value of each encrypted piece. The hash value of each encrypted piece is expressed as follows, for example. {hash(E(K(i, j)) [Cj])} (where, $1 \leq i \leq m$, $1 \leq j \leq N$).

Figures 20, 21:
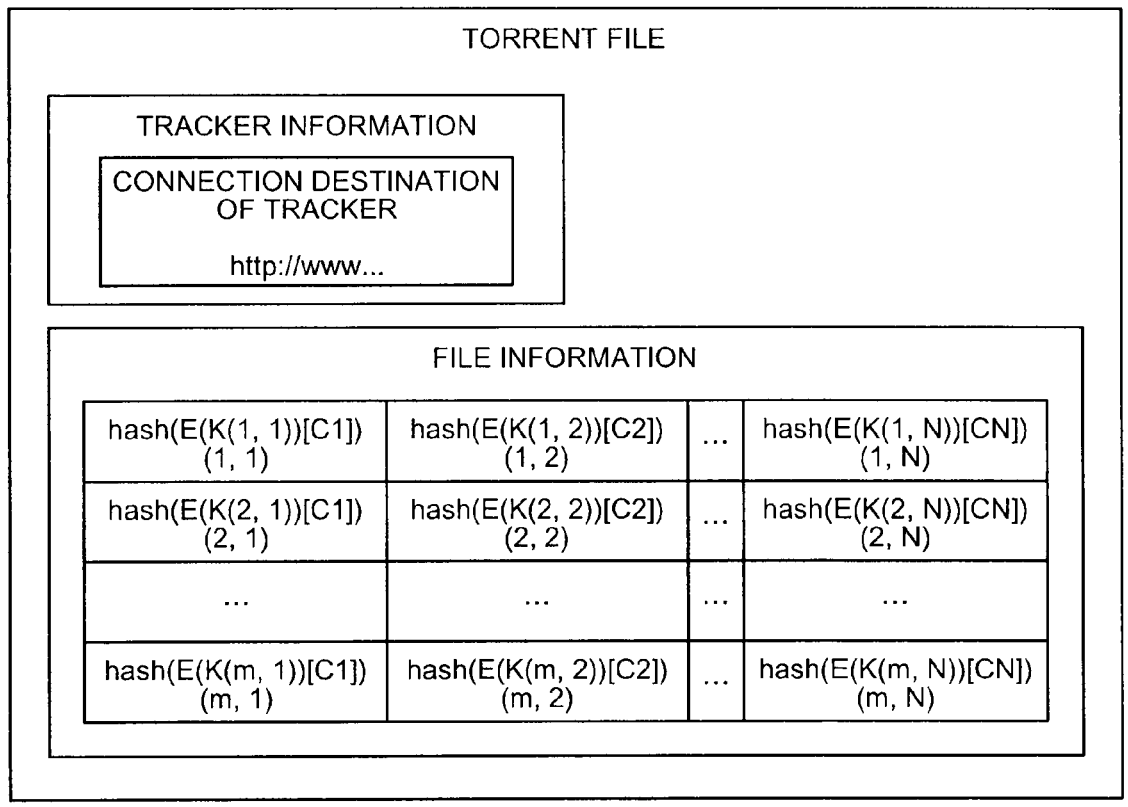
FIG. 20 is a diagram illustrating an example of a data configuration of a Torrent File according to a modification of the first embodiment.
FIG. 21 is a diagram illustrating an example of index information including a hash value according to the modification.

FIG. 20 is a diagram illustrating an example of a data configuration of the Torrent File. The leecher 50 can confirm the completeness of each received encrypted piece, using m×n hash values. A person who generates the Torrent File or a reliable third person (for example, a content producer) can digitally attach a signature to the Torrent File. In this case, the leecher 50 can also confirm validity, in addition to completeness of each received encrypted piece.

In this configuration, the seeder 52 can further transmit piece information including a hash value to the leecher 50. FIG. 21 is a diagram illustrating an example of index information including a hash value. In this case, the leecher 50 can also confirm completeness of each received encrypted piece, using the hash value.

The file information does not need to be for all indexes (in the above example, all (i, j) of $1 \leq i \leq m$, $1 \leq j \leq N$), and can be a part of the all indexes.

The Torrent File can include its version number or valid period information. In this case, the leecher 50 can know whether the obtained Torrent File is valid at this time. For example, when the Torrent File obtained at a certain time is not valid, the leecher 50 can obtain the latest Torrent File. Alternatively, the leecher 50 can obtain the encrypted piece, using the Torrent File obtained at the certain time. When the seeder 52 (for the leecher 50) holds the encrypted piece corresponding to an unknown index, the leecher 50 can receive the encrypted piece corresponding to the unknown index, and can confirm completeness or validity of each encrypted piece received by obtaining the latest Torrent File after receiving the encrypted piece.

In the first embodiment, while the leecher 50 transmits at Step S10 the index information to the key server 53 by including the index information in the request message, the leecher 50 can alternatively transmit the index information to the key server 53 after receiving the accepted message.

In the first embodiment, the node information can alternatively include the uniform resource locator (URL) of the node, instead of a set of the IP address and the port number of the node, or can include the URL of the node in addition to the set of the IP address and the port number of the node.

While the seeder 52 transmits at Step S6 piece information indicating the sequence of pieces held by the seeder 52, based on the access from the leecher 50, the seeder 52 can transmit the piece information to the leecher 50, without waiting for the access from the leecher 50.

At Step S9 described above, while the seeder 52 transmits the encrypted piece to the leecher 50, the seeder 52 can also transmit the corresponding index, in addition to the encrypted piece. For example, when the transmitted encrypted piece is E(K(1, 1))[C1], the seeder 52 can transmit the corresponding index (1, 1) to the leecher 50, in addition to the encrypted piece.

In the first embodiment, while the leecher 50 receives the encrypted piece from the seeder 52, the leecher 50 can obtain the encrypted piece from other leecher 50. The key server 53 and the other server can be configured to have a similar function to that of the seeder 52 that transmits the encrypted piece, so that these leechers 50 can obtain the encrypted piece.

In the first embodiment, while the index j to distinguish between the pieces C1 to CN is handled as a piece index, the order of the pieces constituting the content does not necessarily need to be the same as the order of the encrypted pieces. In this case, the order of the encrypted pieces rearranged to the order of the pieces constituting the content can be handled as the piece index.

In the transmission status table, while the priority flag is used to indicate the priority piece index, a value of the piece index itself selected as the priority piece index can be also recorded in the transmission status table.

In the priority-piece-index selection process at Step S20 described above, when there are plural piece indexes becoming candidates of a priority piece index, the seeder 52 selects at random one of these piece indexes. Alternatively, the seeder can set high priority to an encrypted piece having a variation index of a large maximum value belonging to each encrypted piece corresponding to each piece index of plural candidates, for example. The seeder 52 can select the piece index having a highest priority, and selects this as the priority piece index. Based on this configuration, when the number of variations of the encrypted pieces corresponding to the same piece is increased according to importance, the encrypted piece having high importance can be transmitted with priority. Therefore, the influence of a leakage of a key can be limited.

Alternatively, the seeder can set high priority to a piece candidate having a small value among the plural candidate encrypted pieces, and select the piece index having highest priority, as the priority piece index. Based on this configuration, the seeder 52 can sequentially transmit encrypted pieces starting from the header piece of the content. For example, the order of the piece indexes can be the same as the order (a reproduction order) of the pieces constituting the content. When the leecher 50 at the receiving side sequentially decrypts the encrypted pieces from the header of the encrypted pieces, a delay in the decryption process and the reproduction process can be prevented while decreasing the influence of a leakage of a key. When the order of the pieces is not the same as the order of the encrypted pieces, and also when their relationship is random, a piece index can be selected with priority as a priority piece index, following the order of the corresponding pieces. On the contrary, high priority can be set to a candidate piece index having a large value, and the piece index having a high priority order can be selected as a priority piece index. When the piece index having a large value is transmitted with priority, the leecher 50 can prevent obtaining or reproduction of the encryption key immediately after obtaining the encrypted piece. Therefore, the time for transmitting and receiving an encrypted piece can be secured in the P2P network NT, and the time required for the reproduction can be smoothed.

Alternatively, the seeder 52 can select one priority piece index among the plural candidates of priority piece indexes, based on the distribution sate of the circumferential encrypted pieces that the seeder 52 itself can collect. The distribution state of the encrypted pieces at the circumference of the seeder 52 can be obtained, by analyzing a list showing the piece index and the variation index of the encrypted pieces that the leecher 50 already obtains, by obtaining this list from the leecher 50 present at the circumference of the seeder 52 in the P2P network NT. Alternatively, the seeder 52 can obtain the distribution state from the tracker 51 that can already obtain the distribution state of the encrypted piece at the circumference of the seeder 52. In this case, the seeder 52 selects as a priority piece index, with priority, the piece index having the minimum total number of distribution of the encrypted pieces belonging to the encrypted piece row corresponding to the piece index, or the piece index having a large deviation in the number of transmission times of the plural encrypted pieces, among the piece indexes becoming the candidates of priority piece indexes. Based on this configuration, a piece index suitable for a distribution state of the encrypted pieces at this time can be selected as the priority piece index.

While a modification of the priority-piece-index selection process when there are plural piece index candidates has been explained, various weights can be added to the selection standards for selecting a priority piece index in the modification, and these weights can be combined. Alternatively, in the selection of the priority piece index, not as the selection standard when the numbers of the untransmitted encrypted pieces are the same, numbers of the untransmitted encrypted pieces can be combined. In this case, depending on other selection standard (a size of the value of the variation index, for example), a piece index when the number of the untransmitted encrypted pieces is not a maximum is selected as the priority piece index. According to this configuration, a more flexible selection of a priority piece index becomes possible corresponding to a state.

In the first embodiment, while the seeder 52 transmits one encrypted piece in response to a piece request, the seeder 52 can also transmit plural encrypted pieces all at once. That is, when plural untransmitted encrypted pieces are present among the encrypted pieces belonging to the encrypted piece row corresponding to the priority piece index, the seeder 52 can transmit these untransmitted encrypted pieces to the leecher 50 all at once. When the seeder 52 performs the transmission-status-table update process at Step S27 after performing the process to the piece request at steps S24 to S26 in FIG. 15, and when there is no more untransmitted encrypted piece among the encrypted pieces belonging to the encrypted piece row corresponding to the priority piece index in the middle of the transmission of plural encrypted pieces, the seeder 52 can update the priority piece index by performing the priority-piece-index selection process at Step S20, and can transmit the untransmitted encrypted piece among the encrypted piece belonging to the encrypted piece row corresponding to the new priority piece index. By transmitting plural encrypted pieces from the same encrypted piece row in this way, the seeder 52 can quickly transmit the encrypted piece of a specific encrypted piece row. Particularly, there is a large effect in the encrypted piece having a large maximum value of the variation index. By providing the encrypted piece corresponding to the band speed of the leecher 50 receiving the encrypted piece and the number of connection to other leecher 50, the encrypted piece can be provided to limit the influence of a key leakage. For example, by transmitting plural encrypted pieces to the leecher 50 having a large band rather than to the leecher 50 having a small band, when the leecher 50 becomes a transmitter of the encrypted piece, a single encrypted piece can be transmitted to other leecher 50 at a high speed, thereby avoiding a sharing of the encrypted piece with the other leecher 50.

In the transmission-status-table update process at Step S27, while the initialization of the priority piece index is performed when there is no untransmitted encrypted piece in the encrypted piece row corresponding to the priority piece index, the process is not limited to this. For example, the initialization of the priority piece index can be performed when a proportion of the number of the untransmitted encrypted pieces in the variation index of the encrypted piece row is equal to or smaller than a threshold value. Alternatively, the priority piece index can be initialized after a lapse of a certain time since the priority piece index is set. By providing the above configuration, when the number of variation indexes is larger than the total number of the leechers 50, and even when it is difficult to provide a variation of the encrypted pieces in the encrypted piece row, the following effects can be obtained. For example, the leecher 50 already receiving the encrypted piece corresponding to the priority piece index can smoothly progress the reception of the encrypted piece of other piece index.

Further, the seeder 52 can perform the determination as to whether to initialize the priority piece index corresponding to a relationship between the number (hereinafter, "leecher number") of the leechers 50 connected to the seeder 52 and the number (hereinafter, "variation number") of the variation indexes of the encrypted piece corresponding to the priority piece index at this time. In this case, the seeder 52 has a unit detecting the number (the leecher number) of the leechers 50 connected to the seeder 52. The seeder 52 compares the leecher number detected by this unit with the variation number, at Step S802. When the leecher number is smaller than the variation number, the seeder 52 determines whether the number of the variation indexes of the transmitted encrypted piece is equal to the leecher number. When these numbers are equal, this is set as an initialization condition, and the seeder 52 initializes the priority piece index, in a manner similar to that at Step S803. The seeder 52 stores the leecher number at this stage as an initialization leecher number, and stores the priority piece index at this time as a pre-initialization-priority piece index. At the time of performing next the priority-pieceindex selection process, the seeder 52 compares the leecher number at this time with the initialization leecher number. In this case, when the leecher number is larger than the initialization leecher number, the seeder 52 resets the pre-initialization-priority piece index as a priority piece index. When the leecher number is equal to or smaller than the initialization leecher number, the seeder 52 excludes the pre-initialization-priority piece index from the candidate of the priority piece index, and performs the priority-piece-index selection process. When the leecher number increases, the seeder 52 can set the pre-initialization-priority piece index as a priority piece index. Alternatively, the seeder 52 can add the pre-initialization-priority piece index to the candidate of the priority piece index.

To update the priority piece index before all encrypted pieces corresponding to the all variation indexes are transmitted, and to decrease the influence of the leakage of the key of the encrypted piece of the piece index as a result, the seeder 52 can be configured not to provide the encrypted piece to any leecher 50 until when the leecher number exceeds the variation number. In the priority-piece-index selection process, the seeder 52 can be configured to process only the piece index having a smaller number of the untransmitted encrypted pieces than the leecher number at this time, to select the priority piece index. To update the priority piece index in the priority-piece-index selection process, the seeder 52 stores the pre-update piece index and the leecher number at this time. When there is a change in the leecher number in the next priority-piece-index selection process, the seeder 52 can be configured to determine whether the pre-update piece index can be set with priority as the priority piece index. Based on this configuration, for the piece index of which encrypted pieces corresponding to all variation indexes are not yet transmitted, the encrypted piece corresponding to other piece index can be transmitted before the encrypted piece is shared by many leechers 50. To increase the distribution efficiency of the encrypted piece in the seeder 52, this configuration can be combined with the configuration of the modification described above that the priority piece index is initialized when a proportion of the number of the untransmitted encrypted pieces in the variation index of the encrypted piece row is equal to or smaller than a threshold value. By providing the above configuration, when the variation number is larger than the leecher number and also when the leecher number does not become larger than the variation number, the encrypted piece can be distributed.

Figures 22, 23:
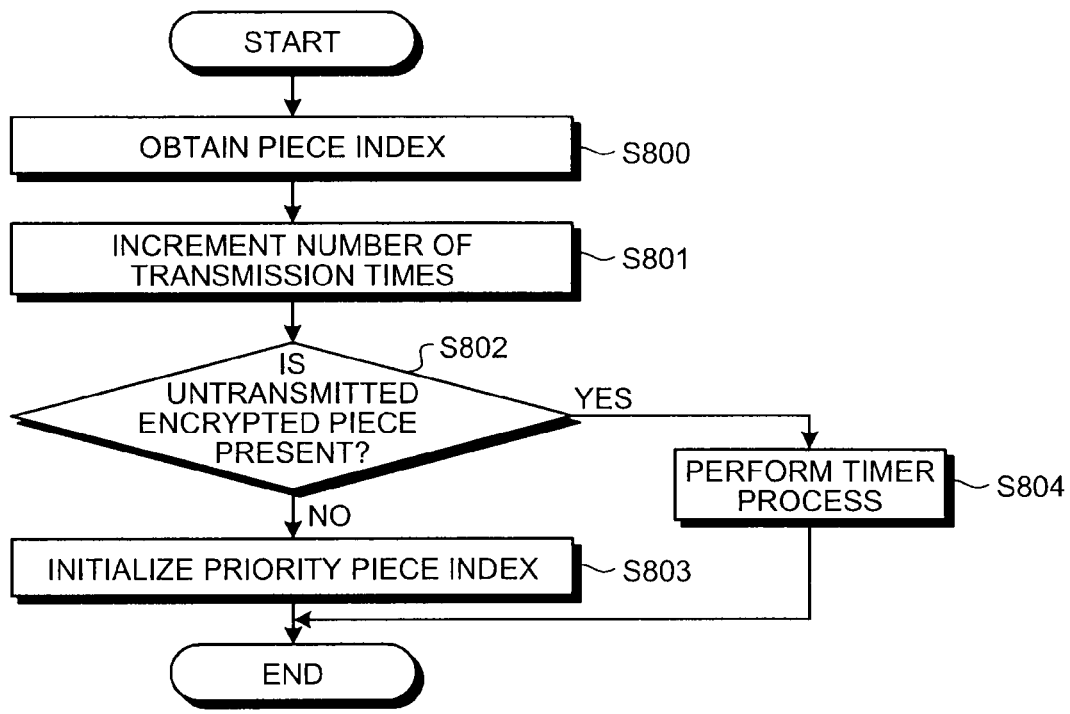
FIG. 22 is a flowchart of a procedure of a transmission-status-table update process according to the modification.
FIG. 23 is a diagram illustrating an example of a data configuration of a piece request according to the modification.

Further, in the transmission-status-table update process at Step S27, when an untransmitted encrypted piece is present at Step S802, the seeder 52 can be configured to set by the overwriting system a timer that generates an update event for updating the priority piece index, and interrupt the update event by the timer. FIG. 22 is a flowchart of a procedure of the transmission-status-table update process according to the modification. Processes at steps S800 to S803 are similar to those in the first embodiment. In this case, when a result of the determination at Step S802 is affirmative, the seeder 52 sets an interruption of the update event by the timer, at Step S804. When the interruption of the update event occurs, in the piece-index determination process, the seeder 52 processes the piece index excluding the priority piece index already set at this time. This piece-index determination process is similar to the process at Step S20, except that it is confirmed whether the priority piece index is in the initial state and that a piece index already set beforehand is not processed. By providing the above configuration, the following distribution mode can be provided. That is, when the variation number is larger than the total number of the leechers 50 and also when a new leecher 50 does not request a reception of the encrypted piece, the leecher 50 already receiving the encrypted piece corresponding to the priority piece index can smoothly progress the reception of the encrypted piece of other piece index.

As described above, when it is considered that the seeder 52 does not transmit all encrypted pieces corresponding to all variation indexes belonging to the encrypted piece row corresponding to the set priority piece index, the seeder 52 can be configured to set in the transmission status table a flag indicating presence of untransmitted pieces (hereinafter, "untransmission flag") to a piece index already set beforehand as a priority piece index, at the time of selecting a priority piece index. In the piece-index determination process, the seeder 52 can appropriately perform a process of determining a piece index of an encrypted piece becoming a transmission candidate using an untransmission flag, in addition to the process of determining a piece index of an encrypted piece becoming a transmission candidate using a priority-piece index flag. That is, the seeder 52 can also select as a priority piece index, at least one of piece indexes of which priority piece index flags are set to "1" and piece indexes of which values of untransmission flags are set to "1". By providing the above configuration, an opportunity of providing a variation of the encrypted pieces not yet transmitted can be provided. By replacing the priority orders of the piece index determination process by the priority-piece index flag and the piece index determination process by the untransmission flag, priority of the discharge efficiency of the encrypted piece and priority of the distribution efficiency of the encrypted piece can be changed over. As a priority order to be applied to determine by the untransmission flag a piece index of the encrypted piece becoming a transmission candidate, a queue structure or a stack structure can be used, or the structure can be simply random.

A piece request that the seeder 52 receives at Step S9 explained above can include two requests of a piece request to a communication apparatus that performs the encrypted-piece process according to the first embodiment, and a piece request to a communication apparatus to unconditionally provide an encrypted piece in response to a request from the leecher 50. When a communication apparatus that unconditionally provides the encrypted piece in response to a request from the leecher 50 is present, a communication apparatus that receives the piece request can appropriately perform the process in response to the piece request, and can transmit the encrypted piece to the leecher 50. On the other hand, the leecher 50 does not need to change over between messages depending on whether the other party transmitting the piece request is the former communication apparatus or the latter communication apparatus. Therefore, the leecher 50 does not need to determine whether the communication apparatus is the former communication apparatus or the latter communication apparatus. As a result, processing load of the leecher 50 can be decreased.

The piece request that the seeder 52 receives at Step S9 described above can include a list showing a set (i, j) of a piece index j (called an assigned piece index) and a variation index (called an assigned variation index), assigned by the leecher 52. In this case, in the piece index determination process at Step S22, the seeder 52 compares the priority piece index with the assigned piece index, and when these piece indexes coincide with each other, the seeder 52 determines the assigned piece index as a piece index of the encrypted piece becoming a transmission candidate. In the variation-index determination process at Step S24, the seeder 52 references the number of transmission times of the transmission status table, and determines whether the encrypted piece corresponding to the assigned variation index is the untransmitted encrypted piece among the encrypted pieces belonging to the encrypted piece row corresponding to the assigned piece index. That is, the seeder 52 determines whether the number of transmission times of the encrypted piece is "0". When a result of the determination is affirmative, the seeder 52 reads the encrypted piece corresponding to the assigned variation index and the assigned piece index, from the external storage device, and transmits the read encrypted piece to the leecher 50. By providing the above configuration, when an encrypted piece that the leecher 50 desires is present, the leecher 50 can efficiently obtain this encrypted piece.

Alternatively, the piece request that the seeder 52 receives at Step S9 described above can include a list showing the piece index j (the assigned piece index) assigned by the leecher 50. In this case, in the piece-index determination process at Step S22, the seeder 52 compares the priority piece index with the assigned piece index, and when these piece indexes coincide with each other, the seeder 52 determines the assigned piece index as the piece index of a transmission-candidate encrypted piece. In the variation-index determination process at Step S24, the seeder 52 references the number of transmission times corresponding to the variation index of the encrypted piece belonging to the encrypted piece row corresponding to the assigned piece index, in the transmission status table, and determines whether there is an untransmitted encrypted piece among the encrypted pieces belonging to the encrypted piece row. When a result of the determination is affirmative, the seeder 52 reads from the external storage device the variation indexes of the untransmitted encrypted piece and the encrypted piece corresponding to the piece index, and transmits the variation indexes to the leecher 50. By providing the above configuration, the leecher 50 can obtain the encrypted piece corresponding to the piece index that the leecher 50 desires, and can prevent the seeder 52 from transmitting the encrypted piece corresponding to the preliminarily obtained piece index.

The piece request that the seeder 52 receives at Step S9 described above can include a part-data request to request data of the unobtained part of the encrypted piece (called a part-obtained encrypted piece) for which the leecher 50 already obtains a part of the data. This part-data request and the unobtained-piece request to request the encrypted piece of which all data are unobtained can be included in discrimination. The part-data request can be a list showing information assigning a set (i, j) of the assigned piece index and the assigned variation index to assign the part-obtained encrypted piece, and a data range of unobtained part of data. The unobtained-piece request can be a list showing the set (i, j) of the assigned piece index and the assigned variation index to assign the unobtained encrypted piece, or a list showing only the assigned piece index. FIG. 23 is a diagram illustrating an example of a data configuration of the piece request according to the modification. FIG. 23 depicts that, for the part-data request, data from a 100-th byte to a 400-th byte is assigned as a data range of unobtained data, among the data of the encrypted piece corresponding to the index of (1, 19), for example. FIG. 23 also depicts that the unobtained-piece request is a list showing only the assigned piece index.

In this configuration, in the piece-index determination process at Step S22, the seeder 52 compares the priority piece index with the assigned piece index shown in the part-data request. When these piece indexes coincide with each other, the seeder 52 performs the following process. In the variation-index determination process at Step S24, the seeder 52 determines whether the encrypted piece corresponding to the assigned variation index is the untransmitted encrypted piece, among the encrypted pieces belonging to the encrypted piece row corresponding to the priority piece index. When a result of the determination is affirmative, the seeder 52 reads data of the assigned data range from the external storage device, among the encrypted pieces corresponding to the assigned variation index and the assigned piece index, and transmits the data to the leecher 50. By providing this configuration, the seeder 52 does not need to separately enquire the variation index held by the leecher 50, and the processing load of the seeder 52 and the leecher 50 can be decreased.

When the piece request includes the unobtained-piece request in addition to the part-data request, the seeder 52 compares the priority piece index with the assigned piece index shown in the part-data request. When these piece indexes do not coincide with each other, the seeder 52 compares the priority piece index with the assigned piece index shown in the unobtained-piece request. When these piece indexes coincide with each other, the seeder 52 determines in the variation-index determination process at Step S24, whether the encrypted piece corresponding to the assigned variation index is the untransmitted encrypted piece, among the encrypted pieces belonging to the encrypted piece row corresponding to the priority piece index. When a result of the determination is affirmative, the seeder 52 reads from the external storage device the encrypted pieces corresponding to the assigned variation index and the assigned piece index, and transmits the read encrypted pieces to the leecher 50.

Even when the encrypted piece corresponding to the assigned variation index assigned in the part-data request is not the untransmitted encrypted piece, the seeder 52 can transmit the encrypted piece by prioritizing the completion of the part-obtained encrypted piece of the leecher 50. In the piece-index determination process, when the priority piece index does not coincide with the assigned piece index assigned in the part-data request as a result of the comparison, the seeder 52 can determine the assigned piece index as a piece index of the transmission-candidate encrypted piece. By providing the above configuration, the leecher 50 can receive with priority the data necessary for the part-obtained encrypted piece. Therefore, the encrypted piece can be completed earlier, and the encrypted piece can be completed earlier. Because the encrypted piece can be shared with other leecher 50, the distribution efficiency can be improved.

The part-data request can be a list showing information to assign only the assigned piece index instead of the set (i, j) of the assigned piece index and the assigned variation index to assign the part-obtained encrypted piece, and the data range of the unobtained data. In this case, the piece-index determination process is the same as that described above. In the variation-index determination process, the seeder 52 determines the variation index of the encrypted piece to be transmitted, using at least one method or a combination of the methods according to the first embodiment or the modification. In this example, the seeder 52 determines whether the piece index determined in the piece index determination process is assigned in the part-data request or is assigned in the unobtained request. As a result of the determination, when the piece index of the transmission-candidate encrypted piece is assigned in the unobtained request, the seeder 52 reads from the external storage device the encrypted pieces corresponding to the piece index and the variation index determined in the variation-index determination process corresponding to the piece index, and transmits the encrypted pieces to the leecher 50. On the other hand, when the piece index of the encrypted piece becoming a transmission candidate is assigned in a part-data obtain request, the seeder 52 performs the process of obtaining information to assign the assigned variation index to assign the part-obtained encrypted piece and a data range of the data of the unobtained part. One example of this process is described below.

First, the seeder 52 notifies the leecher 50 of the piece index determined as the piece index of the transmission-candidate encrypted piece. When the seeder 52 cannot determine a piece index of the transmission-candidate encrypted piece, the seeder 52 can either transmit a message to this extent or not transmit this message to the leecher 50. In the former case, the processing efficiency of the leecher 50 can be improved, and in the latter case, the processing efficiency and attack proof of the seeder 52 can be improved. On the other hand, when the leecher 50 receives a notification from the seeder 52 about the piece index of the transmission-candidate encrypted piece, the leecher 50 transmits to the seeder 52 in response to this notification, information to specify a variation index (an assigned variation index) of the part-obtained encrypted piece corresponding to the piece index and information to specify a data range of the unobtained part of data. Upon receiving this information, the seeder 52 compares the variation index determined in the variation-index determination process with the assigned variation index. When these variation indexes coincide with each other, the seeder 52 reads from the external storage device the data within the assigned data range among the encrypted pieces corresponding to the determined piece index and assigned variation index, and transmits the read data to the leecher 50.

When the variation index determined in the variation-index determination process does not coincide with the assigned variation index, the seeder 52 can either notify or not notify the leecher 50 about the fact that a transmittable encrypted piece is not present. Effect expected in this case is the same as described above. Even when the variation index determined in the variation-index determination process coincides with the assigned variation index, the seeder 52 can reject the provision of the encrypted piece index, depending on the assigned data range. For example, when the data from the header of the encrypted piece to the middle data is assigned as a data range, the seeder 52 can reject the provision of the encrypted piece. This is because loss of data at the circumference of the header is not assumed in the normal exchanges of encrypted pieces, it can be determined that the leecher 50 has a certain intentional attack. When a proportion of obtained pieces assumed from the assigned data range does not exceed a certain threshold value, the provision of the encrypted piece can be rejected for the same reason.

As described above, by determining whether to transmit an encrypted piece based on the assigned data range, the influence of the leecher 50 performing the operation normally not assumed can be excluded, and safety can be improved. That is, as described above, the seeder 52 can decrease the processing load when the leecher 50 provides the encrypted piece of which all data are yet to be obtained, when the leecher 50 branches the process depending on whether a part of the data is preliminarily obtained or all data are yet to be obtained, for the encrypted piece of which transmission is requested. At the same time, in providing the part-obtained encrypted piece, the seeder 52 can add certain restrictive force to the process of the leecher 50 obtaining many encrypted pieces at random, by not disclosing to the leecher 50 the variation index of the encrypted piece to be transmitted, and by making the leecher 50 take time to obtain the encrypted piece. While the seeder 52 notifies only the piece index to the leecher 50, the seeder 52 can also transmit the variation index determined in the variation-index determination process. In this case, the leecher 50 can more quickly determine whether the encrypted piece is the one that the leecher 50 desires.

A content distribution system according to a second embodiment of the present invention is explained next. Like parts to those in the first embodiment are denoted by like reference numerals, and explanations thereof will be omitted.

The content distribution system according to the second embodiment is different from that of the first embodiment in the functional configuration of the seeder 52. While the seeder 52 according to the second embodiment transmits an encrypted piece corresponding to a piece request from the leecher 50, the seeder 52 transmits with priority all encrypted pieces not yet transmitted for the encrypted pieces held by the seeder 52. At the same time, the seeder 52 selects an encrypted piece to be transmitted among the encrypted piece row not including the untransmitted encrypted row, depending on the situation, and transmits the selected encrypted piece, to improve its distribution efficiency.

FIG. 24 is a diagram illustrating an example of a functional configuration of the seeder 52. The seeder 52 includes the piece-information transmitting unit 520, the piece-request receiving unit 521, the priority-piece-index selecting unit 522, the piece-index determining unit 523, the variation-index determining unit 524, the transmission-status-table updating unit 525, the piece transmitting unit 526, and a transmission-flag checking unit 527.

The transmission-status-table updating unit 525 records the number of transmission times and initializes the priority piece index, in the transmission status table, in a manner similar to that in the first embodiment. In the second embodiment, at the time of initializing the priority piece index, the transmission-status-table updating unit 525 sets a value of a flag indicating pieces are already transmitted (hereinafter, "transmission flag") in the transmission status table. FIG. 25 is a diagram illustrating an example of a data configuration of the transmission status table according to the second embodiment. In the transmission status table shown in FIG. 25, each number of transmission times is recorded corresponding to the index (i, j) of the encrypted piece stored in the seeder 52, and a priority-piece index flag is related to each encrypted piece row, like in the first embodiment. Further, in the second embodiment, a transmission flag is related to each encrypted piece row. Each transmission flag indicates whether all encrypted pieces belonging to the encrypted piece row corresponding to the piece index that is selected as a priority piece index are already transmitted. "OFF" is set to the transmission flag as an initial flag. The transmission-status-table updating unit 525 sets to "ON" the value of the transmission flag to each encrypted piece row corresponding to priority piece index before the initialization, at the time of initializing the priority piece index.

When the piece-request receiving unit 521 receives a piece request, the piece-index determining unit 523 references the priority-piece index flag in the transmission status table, and determines whether there is a piece index selected as a priority piece index When a result of the determination is affirmative, a process is similar to that in the first embodiment. When a result of the determination is negative, the piece-index determining unit 523 determines via the transmission-flag checking unit 527 whether the piece index j of which transmission flag is set to "ON" is present in the transmission status table. When a result of the determination is affirmative, the piece-index determining unit 523 determines the piece index j of the encrypted piece becoming a transmission candidate.

The transmission-flag checking unit 527 references the transmission flag of the transmission status table, and checks the piece index j of which transmission flag is set to "ON".

Functions of the piece-request receiving unit 521, the priority-piece-index selecting unit 522, the variation-index determining unit 524, and the piece transmitting unit 526 are approximately similar to those in the first embodiment.

A functional configuration when the leecher 50 functions as a seeder is also approximately similar to the functional configuration of the seeder 52, and therefore explanation thereof will be omitted.

Figure 26:
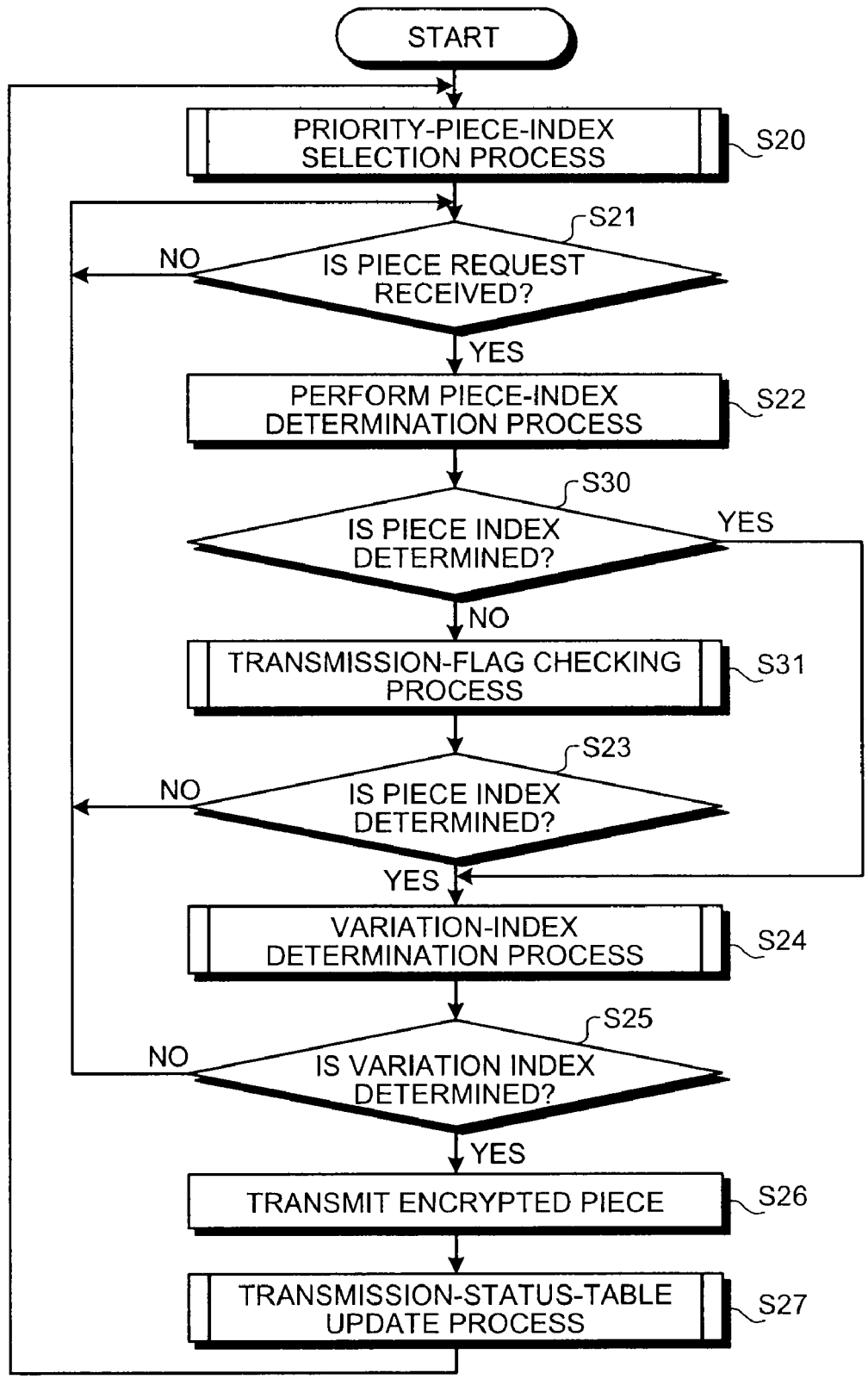
FIG. 26 is a flowchart of procedures of a priority-piece-index selection process and an encrypted-piece transmission process.

A process of the content distribution process performed in the content distribution system according to the second embodiment is explained. While the leecher 50 can also receive the encrypted piece from other leecher 50, it is assumed for the sake of explanation that the encrypted piece is received from at least one of the seeders 52A to 52C. The process itself of the content distribution process according to the second embodiment is as explained with reference to FIG. 14. In the second embodiment, a detailed procedure of the encrypted-piece transmission process at Step S9 in FIG. 14 is different from the process in the first embodiment. FIG. 26 is a flowchart of procedures of the priority-piece-index selection process and the encrypted-piece transmission process according to the second embodiment. At Step S20, the seeder 52 performs the priority-piece-index selection process in a manner similar to that in the first embodiment. In the present case, it is assumed that even when there is no untransmitted encrypted piece, the seeder 52 continues the encrypted-piece transmission process without selecting a priority piece index, and transmits the encrypted piece. Processes at steps S21 and S22 are similar to those in the first embodiment.

At Step S30, the seeder 52 determines whether a piece index of the encrypted piece becoming a transmission candidate is already determined, that is, whether there is a piece index of which priority-piece index flag is set to "1" in the transmission status table and also whether one piece index is determined among these piece indexes. When a result of the determination is affirmative, the process also proceeds in a manner similar to that at Step S24. When a result of the determination is negative, the process proceeds to Step S31. At Step S31, the seeder 52 performs a transmission-flag checking process.

Figure 27:
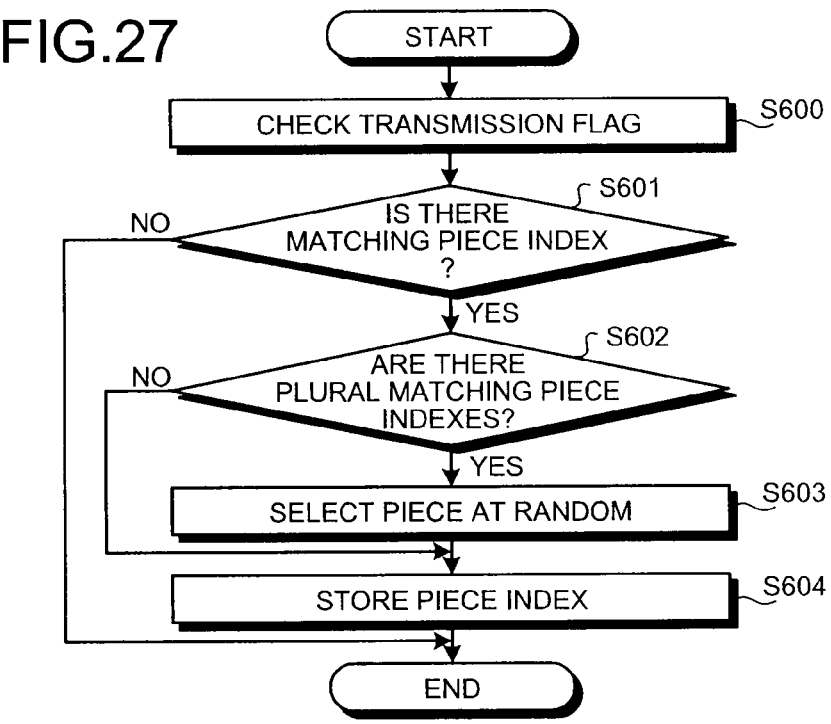
FIG. 27 is a flowchart of a procedure of a transmission-flag checking process.

FIG. 27 is a flowchart of a procedure of the transmission-flag checking process. The seeder 52 first checks piece indexes of which transmission flags are set to "ON" in the transmission status table (Step S600). The seeder 52 determines whether there is a piece index of which transmission flag is set to "ON" (Step S601). When a result of the determination is negative, the seeder 52 ends the transmission-flag checking process, without determining the piece index of the encrypted piece becoming a transmission candidate. When a result of the determination at Step S601 is affirmative, the seeder 52 determines whether there are plural corresponding piece indexes (Step S602). When a result of the determination is negative, the seeder 52 determines the piece index as the piece index of the transmission-candidate encrypted piece (Step S604). When a result of the determination at Step S602 is affirmative, one piece index is selected at random among the plural piece indexes (Step S603). The seeder 52 determines the selected piece index as the piece index of the encrypted piece becoming a transmission candidate (Step S604), and ends the transmission-flag checking process.

In the manner as described above, the seeder 52 references the transmission flag recorded in the transmission status table for each encrypted piece row, and determines the piece index of the encrypted piece becoming a transmission candidate, among the piece indexes corresponding to the encrypted piece row for which all belonging encrypted pieces are already transmitted.

Referring back to FIG. 26, at Step S23, the seeder 52 determines whether a piece index of the encrypted piece becoming a transmission candidate can be determined. When a result of the determination is affirmative, the seeder 52 performs next the variation-index determination process (Step S24). When a result of the determination at Step S23 is negative, the seeder 52 transmits to the leecher 50 a notification message indicating that the encrypted piece is not transmitted, and waits for a new-piece request.

Figure 28:
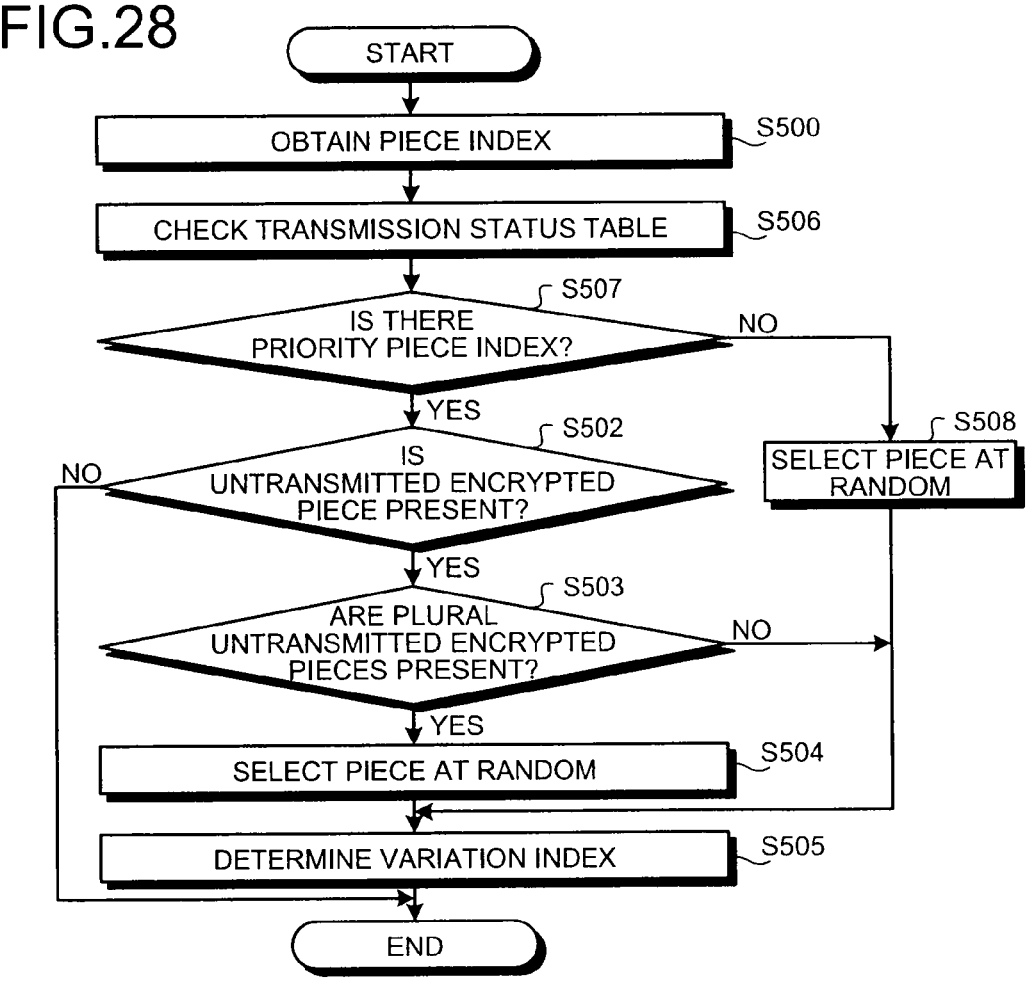
FIG. 28 is a flowchart of a procedure of a variation-index determination process.

FIG. 28 is a flowchart of a procedure of the variation-index determination process according to the second embodiment. A process at Step S500 is similar to that in the first embodiment. At Step S507 after Step S500, the seeder 52 references the transmission status table using the obtained piece index as a key, and determines whether the piece index is the priority piece index, that is, whether a value of the priority piece index of the piece index is set to "1". When a result of the determination is affirmative, this means that the piece index is determined as a priority piece index of the encrypted piece becoming a transmission candidate. In this case, the seeder 52 performs the processes at steps S502 to S505, like in the first embodiment.

On the other hand, when a result of the determination at Step S507 is negative, this means that the piece index is determined not as a priority piece index, but as a piece index of the encrypted piece becoming a transmission candidate by the transmission flag. In this case, the seeder 52 selects at random one variation index among the variation indexes of the encrypted piece belonging to the encrypted piece row corresponding to the piece index, regardless of the number of transmission times recorded in the transmission status table (Step S508). The seeder 52 can be configured to select on variation index, not at random, but based on a distribution state of the encrypted piece in the P2P network NT. The seeder 52 determines the selected variation index as the variation index of the encrypted piece to be transmitted (Step S505).

Referring back to FIG. 26, processes at steps S25 and S26 are similar to those in the first embodiment. At Step S27 after Step S26, the seeder 52 performs the update process of the transmission status table as follows, corresponding to the transmitted encrypted piece. FIG. 29 is a flowchart of a procedure of the transmission-status-table update process according to the second embodiment. Processes at steps S800 to S802 are similar to those in the first embodiment. At Step S805 after Step S802, the seeder 52 sets the value of the transmission flag to "ON", for the piece index selected as the priority piece index, in the transmission status table. Thereafter, at Step S803, the seeder 52 initializes the priority piece index, like in the first embodiment. After initializing the priority piece index by setting the value of the transmission flag in this way, when the seeder 52 attempts to perform the priority-piece-index selection process at Step S20, the priority piece index cannot be selected in some cases. In this case, a result of the determination at Step S23 becomes negative, and a result of the determination at Step S601 in the transmission-flag checking process at Step S30 becomes affirmative.

As described above, the seeder 52 provides the encrypted piece in response to the request of the leecher 50, for the encrypted piece row of which all belonging encrypted pieces are already transmitted. As a result, the distribution efficiency of the encrypted piece can be improved while decreasing the influence due to a leakage of a key, in a manner similar to that in the first embodiment.

While the second embodiment has been explained above, various modifications and improvements can be added thereto.

The configuration of the second embodiment and the configuration of prioritizing the transmission of the part-obtained encrypted piece explained in the modification of the first embodiment can be used together. In this case, the seeder 52 can prioritize either the transmission of the encrypted piece by the transmission flag or the transmission of the encrypted piece by the part-data request.

In the second embodiment, the piece request can include the assigned piece index explained in the modification of the first embodiment. In this case, the seeder 52 performs the following process, by checking the piece index of which value of the transmission flag is set to "ON" in the transmission status table among the assigned piece index, at Step S600 of the transmission-flag checking process.

In the second embodiment, in the transmission-status-flag checking process, the seeder 52 selects at random one piece index among plural piece indexes, at Step S603. Alternatively, the seeder 52 can select one piece index, based on each selection standard, such as the order of the setting of the transmission flags, the number of transmission times of the encrypted piece of each piece index, and the priority order described in the modification of the first embodiment. By providing one piece index in this way, the effect similar to that of the modification can be obtained with the intention that a specific piece index can transmit the encrypted piece faster than other piece index. The above selection standards can be used in combination. For example, for the encrypted piece row corresponding to each piece index, a value obtained by subtracting a minimum value from a maximum value of the number of transmission times is set as a priority order, thereby selecting an encrypted piece row having a large deviation in the number of transmission times of the transmitted encrypted pieces. Further, a value obtained by multiplying (a value obtained by subtracting a minimum value from a maximum value) to (a size of a variation index) is set as a priority order. With this arrangement, in addition to the size of the deviation of the number of transmission times of the transmitted encrypted pieces, importance of the encrypted piece is also taken into consideration, thereby determining the piece index of the encrypted piece becoming a transmission candidate.

In the process of determining the priority order, the priority order can be recorded in the transmission status table, together with the performing of the transmission-status-table update process. That is, the seeder 52 records the priority order in the transmission status table, by setting the priority order of the piece indexes of which transmission flags are to be set to "ON". FIG. 30 is the transmission status table according to a modification of the second embodiment. In FIG. 30, a priority order "1" is recorded for the piece index "0", and a priority order "2" is recorded for a piece index "n−1". The seeder 52 references the priority order recorded in the transmission table, in the transmission-flag checking process. Based on a result of the reference, the seeder 52 determines the piece index of the encrypted piece becoming a transmission candidate, in the piece-index determination process.

By using in combination the untransmission flag according to the modification, as well as the transmission flag and the priority order, the piece index of the encrypted piece becoming a transmission candidate can be determined. In determining this piece index, there is no limitation to which one of the transmission flag, the priority order, and the untransmission flag is prioritized.

In the second embodiment, in the variation index determination process, the seeder 52 can be configured not to select at random one variation index among plural candidates of the variation index, but select one variation index based on the number of transmission times. For example, when the number of transmission times of each encrypted piece corresponding to each of the variation indexes present for the piece index of the encrypted piece becoming a transmission candidate is different, a variation index can be selected so that the numbers of transmission times become the same. For example, it is assumed that variation indexes i1, i2, and i3 ($1 \leq i1, i2, i3 \leq m$) are present as candidates, for the piece index j, and that the numbers of transmission times of the encrypted piece (i1, j), the encrypted piece (i2, j), and the encrypted piece (i3, j) are "1", "2", "3", respectively. In this case, the seeder 52 selects the variation index i1. When the numbers of transmission times of the encrypted piece (i1, j), the encrypted piece (i2, j), and the encrypted piece (i3, j) are "2", "3", "2", respectively, the seeder 52 selects at random either the variation index i1 or i3. By providing this configuration, each encrypted piece can be distributed to the P2P network NT without deviation. As a result, a deviation of the encrypted piece held by the user can be decreased from that when there is a deviation in the encrypted pieces, and the influence due to a leakage of a key can be decreased.

In the first and second embodiments, a server prepared by the tracker 51, the key server 53, or the content manufacturer can divide the content to each piece or encrypt each piece. It is assumed that each encrypted piece is given from the tracker 51, the key server 53, or a reliable third party (for example, a server prepared by the content manufacturer) to the seeder 52A (the initial seeder).

In the first and second embodiments, the key server 53 can be configured to issue and generate at least one of the decryption key and the encryption key, or to obtain at least one of the decryption key and the encryption key that the server prepared by the tracker 51 or the content manufacturer issues and generates.

While it is explained that the all pieces C1 to CN prepared by dividing the content C are encrypted by mutually different encryption keys, a part of the pieces can be encrypted by the same encryption key.

In the first and second embodiments, the numbers of the trackers 51, the seeders 52, and the leechers 50 are not limited to the numbers mentioned above.

The marketing server 54 is connected to the P2P network NT, and the leecher 50 obtains the Torrent File from the marketing server 54. However, the marketing server 54 does not need to be connected to the P2P network NT, and also the leecher 50 can obtain the Torrent File by reading the Torrent File recorded in the recording medium such as the CD-ROM.

While the leecher 50 is explained to be connected to the key server via the network, the leecher 50 can be also connected to the key server via an exclusive line without via the network, or can be connected to the key server via a proxy server. With this arrangement, management capacity can be increased, and the key server 53 at the latter stage of the proxy server can be avoided from being directly attacked.

In the first and second embodiments, the program performed by the seeder 52 can be stored on the computer connected to the network like the Internet, and can be provided by downloading the program via the network. Various programs can be also provided by recording them onto a computer-readable recording medium such as a CD-ROM, a flexible disk (FD), a digital versatile disk (DVD), in a file of an installable format or an executable format. In this case, the seeder 52 reads the program from the recording medium and executes to load the program onto a main storage (such as a RAM), so that each unit explained in the above functional configuration is generated on the main storage. Various programs achieved by the leecher 50 are also performed in a similar manner.

In the first embodiment, the number of transmission times of each encrypted piece and the priority piece index are stored in one transmission status table, and this transmission status table is stored in one external storage device. Alternatively, these pieces of information can be stored in separate tables, and can be also stored in separate storage units. This similarly applies to the transmission flag in the second embodiment, the untransmission flag in the modification, and the priority order in the modification. Further, the storage device that stores the encrypted piece and the storage device that stores the transmission status table can be the same, or can be mutually different.

In the first and second embodiments, while the priority-piece index flag is used as the priority piece information, any information that can specify the priority piece can be used.

In the first and second embodiments, the seeder 52 can also include a function of receiving an encrypted piece from the leecher 50 and other seeder 52, like the leecher 50. When the seeder 52 receives a piece request from the leecher 50, the seeder can determine whether the seeder 52 already receives at least a part of at least one encrypted piece from the leecher 50, and determine whether the encrypted piece can be transmitted based on a result of the determination. The seeder 52 can determine, whether the seeder 52 already receives at least a part of at least one encrypted piece from the leecher 50, based on the amount of data that the seeder 52 already receive by this time. When a result of the determination is affirmative, the seeder 52 determines to transmit the encrypted piece to the leecher 50. When a result of the determination is negative, the seeder 52 determines not to transmit the encrypted piece to the leecher 50. When a result of the determination is the former, the seeder 52 transmits the encrypted piece to the leecher 50 in a manner similar to that of each of the first and second embodiments. This configuration is preferably used in the communication system that obtains each encrypted piece by mutually transmitting the encrypted piece.

In the first and second embodiments, the seeder 52 can be configured to transmit one encrypted piece at plural divided times. In this case, the seeder 52 includes a session-information storage table that stores session information to manage the session relating to the transmission of the encrypted piece. The session information is stored relating to leecher identification information to identify the leecher 50 to which the encrypted piece is to be transmitted. The leecher 50 includes a piece index and a variation index of an encrypted piece (a continuous encrypted piece) of which a part of data is preliminarily obtained, a transmission data amount, and a new-session acceptance flag. The transmission data amount indicates a data amount of a part that the leecher 50 already obtains for the continuous encrypted piece. When the encrypted piece is further divided into plural sub-pieces, the transmission data amount can indicate an index allocated to a sub-piece that the leecher 50 already obtains. The new-session acceptance flag becomes a determination standard for the seeder 52 to determine how to process a piece request (a new-piece request) of an encrypted piece (a new encrypted piece) of which all data is yet to be obtained that the leecher 50, to whom the encrypted piece is to be transmitted, requests. When the new-session acceptance flag is "ON", the seeder 52 can provide a new encrypted piece by accepting the new-piece request from the leecher 50. When the new-session acceptance flag is "OFF", the seeder 52 cannot provide a new encrypted piece. The seeder 52 sets the new-session reception flag to "ON" at the starting time. The leecher identification information is an IP address, a connection-source port number, and identification (ID) information to specify the leecher 50, allocated to the leecher 50. As explained above, the seeder 52 stores the information concerning the continuous encrypted piece, and the leecher identification information to identify the leecher 50, by relating these pieces of information to each other, in the session information. Therefore, the seeder 52 can identify the session at the time of simultaneously transmitting the encrypted piece to plural leechers 50.

Figures 31, 32, 33:
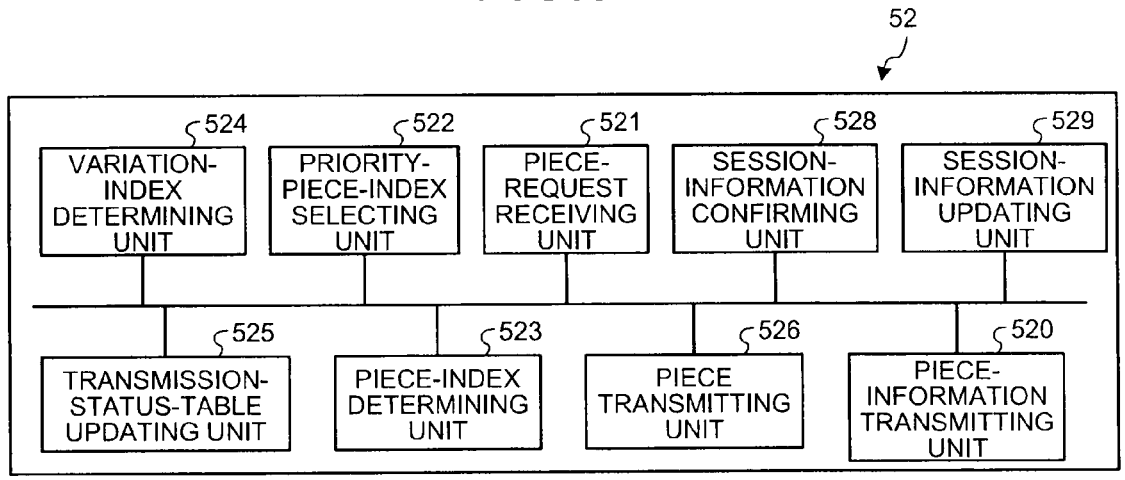
FIG. 31 is a diagram illustrating an example of a functional configuration of a seeder according to the modification.
FIG. 32 is a diagram illustrating an example of a data configuration of a continuous-piece request according to the modification.
FIG. 33 is a diagram illustrating an example of a data configuration of a new-piece request according to the modification.

FIG. 31 is a diagram illustrating an example of a functional configuration of the seeder 52 according to the modification. The seeder 52 includes the piece-request receiving unit 521, the priority-piece-index selecting unit 522, the piece-index determining unit 523, the variation-index determining unit 524, the transmission-status-table updating unit 525, and the piece transmitting unit 526, that are explained in the first and second embodiments. Further, the seeder 52 includes a session-information confirming unit 528, and a session-information updating unit 529. In receiving a piece request from the leecher 50, the piece-request receiving unit 521 obtains leecher identification information. When the piece request received from the leecher 50 is a continuous-piece request to request the continuous encrypted piece, the data configuration becomes as shown in FIG. 32. As shown in FIG. 32, the continuous-piece request includes a new-piece request flag, a piece index and a variation index of the continuous encrypted piece of which transmission is requested, a data starting position, and an obtain-desired data length. The new-piece request flag indicates whether the piece request is a new-piece request. When the new-piece request flag is "ON", this indicates that the piece request is a new-piece request, and when the new-piece request flag is "OFF", this indicates that the piece request is the continuous-piece request. In this example, the new-piece request flag is set to "OFF". The data starting position shows a starting position of data of which continuous encrypted piece is yet to be obtained. The obtain-desired data length is a data length (a data amount) of data that the leecher 50 requests to obtain among data of which continuous encrypted piece is yet to be obtained, and is a data length from the data starting position. It is assumed that the file information included in the Torrent File shows a data amount of each encrypted piece. The leecher 50 calculates the data starting position and calculates a total data length of the unobtained part, based on the data amount, and calculates the obtain-desired data length based on calculated results. Calculation standards of a data amount and a data length are not particularly limited.

When a piece request received from the leecher 50 is a new-piece request, the data configuration becomes as shown in FIG. 33, for example. As shown in FIG. 33, the new piece request includes a new-piece request flag, an obtain-desired data length of which data obtaining is requested, and a list of piece indexes of which obtaining is requested. In this example, the new-piece request flag is set to "ON".

Referring back to FIG. 31, when the piece-request receiving unit 521 receives a new-piece request from the leecher, the session-information confirming unit 528 references the new-session acceptance flag corresponding to the leecher identification information of the leecher 50 in the session information stored in the session-information storage table, and determines whether to accept the piece request. When the piece-request receiving unit 521 receives the new-piece request, the session-information confirming unit 528 sets the new-session acceptance flag to "OFF" via the session-information updating unit 529. When the piece-request receiving unit 521 receives the continuous-piece request from the leecher 50, the session-information confirming unit 528 confirms whether the piece index, the variation index, and the transmission data amount included in the session information stored in relation to the leecher identification information of the leecher 50 in the session-information storage table are matched with the piece index, the variation index, and the data starting position included in the received continuous-piece request, and determines whether to accept the continuous-piece request.

When the piece transmitting unit 526 transmits the new encrypted piece to the leecher 50, the session-information confirming unit 528 stores the piece index, the variation index, and the transmission data amount of the encrypted piece in relation to the identification information of the leecher 50 as the session information, in the session-information storage table. When the piece transmitting unit 526 transmits a continuous encrypted piece, the session-information updating unit 529 calculates the transmission data amount, and updates the transmission data amount in the session information in the session-information storage table. When the transmission data amount reaches the total data amount of the encrypted pieces, the session-information confirming unit 528 determines that the transmission of the encrypted pieces is completed. In this case, the session-information confirming unit 528 sets to "ON" the new-session acceptance flag included in the session information stored in the session-information storage table via the session-information updating unit 529.

The session-information updating unit 529 sets the new-session acceptance flag to "ON" or "OFF", corresponding to the determination of the session-information confirming unit 528.

Figure 34:
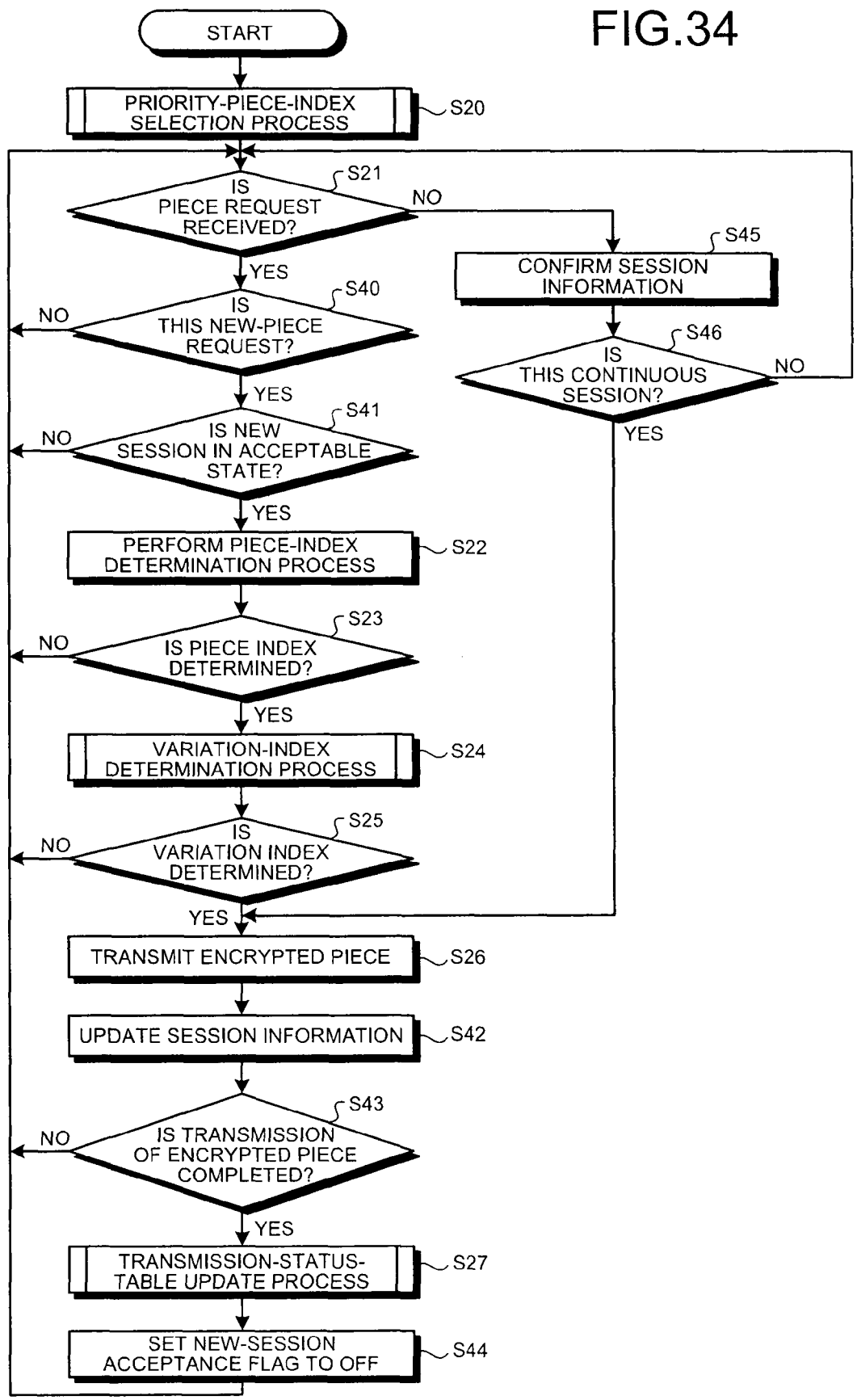
FIG. 34 is a flowchart of procedures of a priority-piece-index selection process and an encrypted-piece transmission process according to the modification.

The priority-piece-index selection process and the encrypted-piece transmission process performed by the seeder 52 according to the modification are explained with reference to FIG. 34. Processes at steps S20 and S21 are similar to those in the first embodiment. When the seeder 52 receives a piece request from the leecher 50 (YES at Step S21), the seeder 52 performs the encrypted-piece transmission process as follows. First, at Step S40, the seeder 52 determines whether the piece request from the leecher 50 is a new-piece request. When the piece request is the continuous-piece request of the data configuration shown in FIG. 32, and also when the new-piece request flag is set to "OFF", a result of the determination at Step S40 is negative, and the process proceeds to Step S45. At Step S45, the seeder 52 references the session information stored in relation to the leecher identification information of the leecher 50 in the session-information storage table, and confirms that the piece index and the variation index included in the received continuous-piece request are equal to the piece index and the variation index included in the session information. After the confirmation, the seeder 52 performs the confirmation process of confirming whether the transmission data amount included in the session information matches the request-data starting position included in the continuous-piece request (Step S46). When the transmission data amount does not match the request-data starting position, the seeder 52 determines that the confirmation process is unsuccessful. When the request-data starting position is "0", the seeder 52 also determines that the confirmation process is unsuccessful. By excluding the continuous-piece request of which request-data starting position is "0", the seeder 52 can exclude the process of the leecher 50 that attempts to collect the encrypted pieces corresponding to specific piece index and variation index from their header position. A threshold value of the request-data starting position at which the leecher process is excluded can be set larger than "0". In this case, the process of the leecher 50 can be made more difficult.

When the above confirmation process is successful (YES at Step S46), the seeder 52 determines that the leecher 50 requests the remaining part of the encrypted piece of data part of which the leecher 50 already obtains, and the process proceeds to Step S26. At Step S26, the seeder 52 reads from the external storage device the data of the encrypted piece corresponding to the piece index, the variation index, the data starting position, and the obtain-desired data length included in the piece request received at Step S21, and transmits the read data to the leecher 50. When the above confirmation process is unsuccessful (NO at Step S46), the seeder 52 abandons the piece request received at Step S21, returns to Step S21, and waits for the next piece request. The seeder 52 can be configured to notify or does not notify the leecher 50 that the encrypted piece is not provided.

At Step S42 after Step S26, the seeder 52 calculates and updates the transmission data amount corresponding to the piece index and the variation index of the encrypted piece transmitted at Step S26, in the session information stored in relation to the leecher identification information of the leecher 50 in the session-information storage table. Thereafter, the seeder 52 determines whether the transmission of the encrypted piece at Step S26 is completed (Step S43). When the transmission data amount of the encrypted piece transmitted at Step S26 reaches the total data amount of the encrypted piece, the seeder 52 determines that the transmission of the encrypted piece is completed. In this case (YES at Step S43), the seeder 52 performs the transmission-status-table update process in a manner similar to that of the first and second embodiments. The seeder 52 sets to "ON" the new-session acceptance flag included in the session information stored in relation to the leecher identification information of the leecher 50 in the session-information storage table. Returning to Step S21, the seeder 52 waits for the next piece request.

On the other hand, at Step S40, when the piece request is the new-piece request of the data configuration as shown in FIG. 33 and also when the new-piece request is set to "ON", a result of the determination made by the seeder 52 becomes affirmative, and the process proceeds to Step S41. At Step S41, the seeder 52 references the new-session acceptance flag included in the session information stored in relation to the leecher identification information of the leecher 50 in the session-information storage table, and determines whether to accept the piece request. When the new-session acceptance flag is set to "ON", the seeder 52 accepts the new-piece request, sets the new-session acceptance flag to "OFF", and proceeds to the process at Step S22. Processes at steps S23 to S26 are similar to those in the first and second embodiments. At Step S26, the seeder 52 reads from the external storage device the data having the obtain-desired data amount included in the new-piece request received at Step S21, for the encrypted piece corresponding to the index (i, j) as a set of the piece index j determined at Step S22 and the variation index i determined at Step S24. The seeder 52 transmits the read data to the leecher 50. Thereafter, the seeder 52 performs the process at and after Step S42 in a manner similar to that in the above descriptions.

According to the above configurations, even when the data amount of the encrypted piece is large, the encrypted piece can be transmitted and received effectively at plural divided times.

It has been explained that the seeder 52 determines whether the received piece request is the new-piece request, using the new-piece request flag as shown in FIGS. 32 and 33. However, the determination method is not limited thereto. For example, the seeder 52 can also determine whether the received piece request is the new-piece request, by determining whether the variation index included in the piece request shown in FIG. 33 has a predetermined special value, by referencing this variation index.

In performing the modification, the reception process of the piece request and the transmission process of the encrypted piece are sometimes performed as separate threads. In this case, when the end of the encrypted-piece transmission process at Step S26 is awaited, a long processing time is required in the process of updating the session information at Step S42, the process of setting the new-session reception flag to "OFF" at Step S44, and the transmission-status-table update process at Step S27. As a result, there is a possibility that a proper new-piece request from the leecher cannot be accepted. Therefore, the processes at Step S43, Step S42, Step S44, and Step S27 can be performed before the encrypted-piece transmission process at Step S26. In this case, the determination at Step S43 as to whether the transmission of the encrypted piece is completed can be performed based on the session information included in the piece request.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus that transmits a plurality of pieces as a part of a content, comprising:
    a first storage unit that stores a plurality of encrypted pieces obtained by encrypting each of the pieces by an encryption key, and that stores a plurality of encrypted pieces obtained by encrypting at least one of first pieces among the pieces by a plurality of different encryption keys;
    a second storage unit that stores number of transmission times of each of the encrypted pieces stored in the first storage unit;
    a selecting unit that selects as priority pieces the encrypted pieces corresponding to at least one of the first pieces, based on number of untransmitted encrypted pieces of which number of transmission times is zero among the encrypted pieces of which the first piece is encrypted;
    a storage control unit that controls the second storage unit so that the second storage unit additionally stores priority piece information specifying a selected priority piece, in the second storage unit;
    a receiving unit that receives a piece request requesting an encrypted piece, from other communication apparatus;
    a first determining unit that determines as transmission candidates the encrypted pieces specified as the priority pieces by the priority piece information, when the piece request is received;
    a second determining unit that determines at least one of the untransmitted encrypted pieces as an encrypted piece to be transmitted, among the encrypted pieces determined as transmission candidates;
    a transmitting unit that transmits the encrypted piece determined to be transmitted, to the other communication apparatus;
    a first updating unit that updates number of transmission times of each of the encrypted pieces stored in the second storage unit, in accordance with the encrypted piece transmitted by the transmitting unit;
    a second updating unit that updates the priority piece information stored in the second storage unit, in the second storage unit, so that the priority piece becomes in an initial state not specified by the priority piece information, when the untransmitted encrypted piece is not present any more among the encrypted pieces specified as priority pieces by the priority piece information; and
    a processor configured to execute at least the selecting unit.

2. The apparatus according to claim 1, wherein when a plurality of first pieces are present for which numbers of the untransmitted encrypted pieces are the same, the selecting unit selects the priority pieces based on number of the encrypted pieces present corresponding to each first piece.

3. The apparatus according to claim 1, wherein a piece index to discriminate each of the pieces and a variation index to discriminate each of the different encrypted keys are related to each of the encrypted pieces corresponding to the first piece,
    the piece index and the variation index related to each encrypted piece are related to the number of transmission times,
    the selecting unit selects at least one of the piece indexes as a priority piece index, based on the number of the untransmitted encrypted pieces of which the number of transmission times related to the piece index corresponding to each of the encrypted pieces is zero, for the encrypted pieces corresponding to the at least one first piece, and
    the storage control unit controls the second storage unit so that the second storage unit additionally stores information to specify the piece index selected as the priority piece, as the priority piece information.

4. The apparatus according to claim 3, wherein when there are a plurality of the piece indexes of which the numbers of untransmitted encrypted pieces are the same, the selecting unit selects at least one of the piece indexes as a priority piece, based on a value of each piece index.

5. The apparatus according to claim 1, wherein when a plurality of first pieces are present for which numbers of the untransmitted encrypted pieces are the same, the selecting unit selects the priority pieces based on number of the encrypted pieces retained in the other communication apparatus.

6. The apparatus according to claim 3, wherein the receiving unit receives the piece request assigning a set of the piece index and the variation index related to the requested encrypted piece,
    when the piece request is received, the first determining unit determines at least one of the piece indexes coinciding with the piece index specified by the priority piece information as a piece index of the encrypted piece becoming a transmission candidate, among the piece indexes assigned by the piece request, and
    the second determining unit references the number of transmission times of the encrypted piece related to the variation index to which the set of the determined piece index and the corresponding piece index is assigned in the piece request, and determines at least one of the untransmitted encrypted pieces as an encrypted piece to be transmitted.

7. The apparatus according to claim 3, wherein the receiving unit receives the piece request assigning the piece index related to the requested encrypted piece, when the piece request is received, the first determining unit determines, as a piece index of an encrypted piece becoming a transmission candidate, at least one of the piece indexes coinciding with the piece index specified by the priority piece information, among the piece indexes assigned by the piece request, and the second determining unit references the number of transmission times of each of the encrypted pieces related to the determined piece index, and determines at least one of the untransmitted encrypted pieces as an encrypted piece to be transmitted.

8. The apparatus according to claim 3, wherein the receiving unit assigns the piece index and the variation index related to the encrypted piece of which part of data is already obtained by the other communication apparatus, assigns a data range of data of which encrypted piece is yet to be obtained, and receives the piece request including a part-data request to request the data, when the piece request includes the part-data request, the first determining unit determines at least one of piece indexes coinciding with the piece index specified by the priority piece information, as a piece index of the encrypted piece becoming a transmission candidate, among the piece indexes assigned by the part-data request, the second determining unit references the number of transmission times of the encrypted piece related to the variation index to which the set of the determined piece index and the corresponding piece index is assigned in the part-data request, and determines at least one of the untransmitted encrypted pieces as an encrypted piece to be transmitted, and the transmitting unit transmits to the other communication apparatus the data range assigned by the part-data request, for the encrypted piece determined to be transmitted.

9. The apparatus according to claim 3, wherein the receiving unit receives the piece request including a part-data request to assign the piece index related to the encrypted piece of which part of data is already obtained by the other communication apparatus, the first determining unit includes a third determining unit that, when the piece request includes the part-data request, determines at least one of piece indexes coinciding with the piece index specified by the priority piece information, as a piece index of the encrypted piece becoming a transmission candidate, among the piece indexes assigned by the part-data request, a notifying unit that notifies the determined piece index to the other communication apparatus, and a range receiving unit that receives from the other communication apparatus a variation index related to an encrypted piece to which the determined piece index is related and of which part of data is already obtained, and a data range of data of which the encrypted piece is yet to be obtained, the second determining unit references the number of transmission times of the encrypted piece to which the determined piece index and the received variation index are related, and determines at least one of the untransmitted encrypted pieces as an encrypted piece to be transmitted, and the transmitting unit transmits to the other communication apparatus data of the received data range, for the encrypted piece determined to be transmitted.

10. The apparatus according to claim 3, wherein the receiving unit receives a piece request including a part-data request to request the data by assigning the piece index and the variation index related to the encrypted piece of which part of data is already obtained by the other communication apparatus and by assigning a data range of data of which encrypted piece is yet to be obtained, and an unobtained-piece request to request the encrypted piece by assigning the piece index related to the encrypted piece of which all data is yet to be obtained by the other communication apparatus, the first determining unit includes a fourth determining unit that determines at least one of the piece indexes as a piece index of an encrypted piece becoming a transmission candidate, when the piece request includes the part-data request and the unobtained-piece request, and when there is a piece index coinciding with the piece index specified by the priority piece information among the piece indexes assigned by the part-data request, and a fifth determining unit that determines as a piece index of an encrypted piece becoming a transmission candidate, at least one of piece indexes coinciding with the piece index specified by the priority piece information among the piece indexes assigned by the unobtained-piece request, when there is no piece index coinciding with the piece index specified by the priority piece information among the piece indexes assigned by the part-data request, and when the fourth determining unit determines the piece index, the second determining unit determines as an encrypted piece to be transmitted, at least one of the untransmitted encrypted pieces, by referencing the number of transmission times of the encrypted piece related to the variation index to which the set of the determined piece index and the corresponding piece index is assigned in the part-data request, and when the fifth determining unit determines the piece index, the second determining unit determines as an encrypted piece to be transmitted, at least one of the untransmitted encrypted pieces, by referencing the number of transmission times of each of the encrypted pieces related to the piece index.

11. The apparatus according to claim 1, wherein said first determining unit further determines whether to update the priority piece, based on time lapsed since the priority piece is selected, and when the first determining unit determines to update the priority pieces, the first determining unit determines as transmission candidates, the encrypted pieces corresponding to at least the first piece other than the encrypted pieces specified by the priority piece information.

12. The apparatus according to claim 1, further comprising a detecting unit that detects number of other communication apparatuses, wherein said second determining unit further determines whether the number of the detected other communication apparatuses is equal to number of the untransmitted encrypted pieces among the encrypted pieces when the number of the detected other communication apparatuses is smaller than number of the encrypted pieces selected as the priority pieces, wherein when a result of the determination by the second determining unit is affirmative, the storage control unit controls the second storage unit so that the second storage unit stores initialization-priority piece information to specify the priority pieces specified by the priority piece information as initialization priority pieces, and stores detected number of other communication apparatuses as an initialization device number, when a result of the determination by the second determining unit is affirmative, the second updating unit updates the priority information to the initial state, and when number of other communication apparatuses detected after the priority piece information is updated is larger than number of the initialization devices, the selecting unit selects again as the priority pieces the initialization priority pieces specified by the initialization-priority piece information, and when the number of other communication apparatuses detected after the priority piece information is updated is equal to or smaller than the number of the initialization devices, the selecting unit selects as the new priority pieces the encrypted pieces corresponding to at one of the first pieces other than the priority pieces specified by the initialization-priority piece information.

13. The apparatus according to claim 3, wherein the storage control unit controls the second storage unit so that the second storage unit additionally stores a transmission flag indicating whether all the encrypted pieces of which first pieces are encrypted are already transmitted by relating the transmission flag to the piece index, the apparatus further includes a transmission-flag checking unit that checks the transmission flag when the first determining unit does not determine the piece indexes of the encrypted pieces becoming transmission candidates, and determines as a piece index of an encrypted piece becoming a transmission candidate, at least one of the piece indexes related to the transmission flag indicating that all the encrypted pieces are already transmitted, and when the transmission-flag checking unit determines a piece index of an encrypted piece becoming a transmission candidate, the second determining unit determines at least one of encrypted pieces related to the piece index, as an encrypted piece to be transmitted.

14. The apparatus according to claim 13, wherein when the first determining unit does not determine the piece indexes of the encrypted pieces becoming transmission candidates, the transmission-flag checking unit checks the transmission flag, sets a priority order to the piece indexes related to the transmission flag indicating that all the encrypted pieces are already transmitted, and determines piece indexes of encrypted pieces becoming transmission candidates.

15. The apparatus according to claim 3, wherein when the new priority pieces are selected when the untransmitted encrypted pieces are present among the encrypted pieces selected as the priority pieces, the storage control unit controls the second storage unit so that the second storage unit additionally stores, an untransmission flag indicating presence of the untransmitted encrypted pieces related to the piece indexes corresponding to the priority pieces before being selected anew, and the first determining unit determines piece indexes of encrypted pieces becoming transmission candidates, using at least one of the priority piece information and the untransmission flag.

16. The apparatus according to claim 1, further comprising:

a piece receiving unit that receives the encrypted pieces from other communication apparatus; and a piece-storage control unit that controls the first storage unit so that the first storage unit stores the received encrypted pieces.

17. The apparatus according to claim 16, further comprising:

a reception determining unit that determines whether at least a part of at least one encrypted piece is received from other communication apparatus via the piece receiving unit, when the piece request is received from the other communication apparatus; and a transmission determining unit that determines whether to transmit the encrypted piece to the other communication apparatus, depending on a result of the determination of the reception determining unit, wherein when it is determined to transmit the encrypted piece to the other communication apparatus, the first determining unit references the priority piece information, and determines the encrypted pieces specified as the priority pieces, as transmission candidates.

18. The apparatus according to claim 1, wherein the first storage unit stores each encrypted piece encrypted by at least one encryption key, for all plurality of pieces constituting a content.

19. The apparatus according to claim 3, further comprising:

a third storage unit that stores as session information, the piece index and the variation index related to a continuous encrypted piece of which part of data is already obtained by the other communication apparatus, and a data amount of the part of data, by relating these pieces of information to identification information to identify the other communication apparatus;

a confirming unit that confirms consistency of the session information and a continuous-piece request, when the receiving unit receives from the other communication apparatus the continuous-piece request as the piece request that includes identification information and that assigns the piece index and the variation index related to the encrypted piece, a data starting position of data excluding the part of the continuous encrypted piece, and a first obtain-desired-data amount of data which is desired after excluding the part; and a third updating unit that updates the session information, wherein the transmitting unit transmits to the other communication apparatus, data having the first obtain-desired-data amount from the data starting position for the continuous encrypted data, based on a result of the confirmation by the confirming unit, and the third updating unit updates the session information, based on the transmitted data.

20. The apparatus according to claim 19, wherein the third storage unit further stores in relation to the identification information, a new-acceptance flag indicating whether to accept a new-piece request as the piece request requesting a new-encrypted piece of which all data the other communication apparatus has yet to obtain and including the identification information, and when the data amount of the part of the continuous encrypted piece reaches a total data amount of the continuous encrypted piece following the updating of the session information corresponding to the identification information, the third updating unit updates the new-acceptance flag corresponding to the identification information.

21. The apparatus according to claim 20, wherein the receiving unit receives the new-piece request including a second obtain-desired-data amount requesting an obtaining of the new-encrypted piece, when the new-piece request is received and also when the acceptance flag corresponding to the identification information included in the new-piece request indicates an acceptance of the new-piece request, the first determining unit determines as transmission candidates the encrypted pieces specified as the priority pieces by the priority piece information, and the transmitting unit transmits to the other communication apparatus, data having the second obtain-desired-data amount of the new-encrypted piece.

22. A communication system comprising:
a first communication apparatus performing transmission and reception of a plurality of pieces as a part of a content; and
a second communication apparatus performing transmission and reception of a plurality of pieces as a part of a content, the a first communication apparatus and the second communication apparatus being connected via a network, wherein each of the first communication apparatus and the second communication apparatus includes
a first storage unit that stores a plurality of encrypted pieces obtained by encrypting each of the pieces by an encryption key, and that stores a plurality of encrypted pieces obtained by encrypting at least one of first pieces among the pieces by a plurality of different encryption keys,
a second storage unit that stores number of transmission times of each of the encrypted pieces stored in the first storage unit,
a selecting unit that selects as priority pieces the plurality of encrypted pieces corresponding to at least one of the first pieces, based on number of untransmitted encrypted pieces of which number of transmission times is zero among the encrypted pieces of which the first piece is encrypted,
a storage control unit that controls the second storage unit so that the second storage unit additionally stores priority piece information specifying a selected priority piece,
a receiving unit that receives a piece request requesting an encrypted piece, from other communication apparatus,
a first determining unit that determines as transmission candidates the encrypted pieces specified as the priority pieces by the priority piece information, when the piece request is received,
a second determining unit that determines at least one of the untransmitted encrypted pieces as an encrypted piece to be transmitted, among the encrypted pieces determined as transmission candidates,
a transmitting unit that transmits the encrypted piece determined to be transmitted, to the other communication apparatus,
a first updating unit that updates number of transmission times of each of the encrypted pieces stored in the second storage unit, following the encrypted piece transmitted by the transmitting unit,
a second updating unit that updates the priority piece information in the second storage unit, so that the priority piece becomes in an initial state not specified by the priority piece information, when the untransmitted encrypted piece is not present any more among the encrypted pieces specified as priority pieces by the priority piece information,
a piece receiving unit that receives the encrypted piece from other communication apparatus,
a piece-storage control unit that controls the first storage unit so that the first storage unit additionally stores the received encrypted piece, and
a processor configured to execute at least the selecting unit, and wherein
the transmitting unit included in the first communication apparatus transmits the encrypted piece determined to be transmitted, to the second communication apparatus, and the piece receiving unit included in the second communication apparatus receives the encrypted piece transmitted from the transmitting unit included in the first communication apparatus.

23. The system according to claim 22, wherein
the first communication apparatus further includes
a reception determining unit that determines whether at least one encrypted piece is received from the second communication apparatus via the piece receiving unit, when the piece request is received from the second communication apparatus, and
a transmission determining unit that determines whether to transmit the encrypted piece to the second communication apparatus, based on a result of the determination by the reception determining unit, and wherein
when it is determined that the encrypted piece is transmitted to the second communication apparatus, the first determining unit included in the first communication apparatus references the priority piece information, and determines as transmission candidates the encrypted pieces specified as the priority pieces.

24. A transmitting method implemented in a communication apparatus that transmits a plurality of pieces as a part of a content, and includes a first storage unit that is a storage unit storing a plurality of encrypted pieces obtained by encrypting each of the pieces by an encryption key, and that stores a plurality of encrypted pieces obtained by encrypting at least one of first pieces among the pieces by a plurality of different encryption keys, and a second storage unit that stores number of transmission times of each of the encrypted pieces stored in the first storage unit, the method comprising:
selecting as priority pieces the encrypted pieces corresponding to at least one of the first pieces, based on number of untransmitted encrypted pieces of which number of transmission times is zero among the encrypted pieces of which the first piece is encrypted;
controlling the second storage unit so that the second storage unit additionally stores priority piece information specifying a selected priority piece;
receiving a piece request requesting an encrypted piece from other communication apparatus;
determining as transmission candidates the encrypted pieces specified as the priority pieces by the priority piece information, when the piece request is received;
determining at least one of the untransmitted encrypted pieces as an encrypted piece to be transmitted, among the encrypted pieces determined as transmission candidates;
transmitting the encrypted piece determined to be transmitted, to the other communication apparatus;
updating number of transmission times of each of the encrypted pieces stored in the second storage unit, in accordance with the transmitted encrypted piece; and
updating the priority piece information stored in the second storage unit, in the second storage unit, so that the priority piece becomes in an initial state not specified by the priority piece information, when the untransmitted encrypted piece is not present any more among the encrypted pieces specified as priority pieces by the priority piece information.

25. A computer program product having including a non-transitory computer readable medium including programmed instructions, when executed by a computer provided in a communication apparatus that transmits a plurality of pieces as a part of a content, and includes a first storage unit that is a storage unit storing a plurality of encrypted pieces obtained by encrypting each of the pieces by an encryption key, and that stores a plurality of encrypted pieces obtained by encrypting at least one of first pieces among the pieces by a plurality of different encryption keys, and a second storage unit that stores number of transmission times of each of the encrypted pieces stored in the first storage unit, wherein the instructions, cause the computer to perform:

selecting as priority pieces the encrypted pieces corresponding to at least one of the first pieces, based on number of untransmitted encrypted pieces of which number of transmission times is zero among the encrypted pieces of which the first piece is encrypted;

controlling the second storage unit so that the second storage unit additionally stores priority piece information specifying a selected priority piece in the second storage unit;

receiving a piece request requesting an encrypted piece from other communication apparatus;

determining as transmission candidates the encrypted pieces specified as the priority pieces by the priority piece information, when the piece request is received;

determining at least one of the untransmitted encrypted pieces as an encrypted piece to be transmitted, among the encrypted pieces determined as transmission candidates;

transmitting the encrypted piece determined to be transmitted, to the other communication apparatus;

updating number of transmission times of each of the encrypted pieces stored in the second storage unit, in accordance with the transmitted encrypted piece; and updating the priority piece information stored in the second storage unit, in the second storage unit, so that the priority piece becomes in an initial state not specified by the priority piece information, when the untransmitted encrypted piece is not present any more among the encrypted pieces specified as priority pieces by the priority piece information.

\* \* \* \* \*